US008380850B1

(12) United States Patent
Ahuja et al.

(10) Patent No.: US 8,380,850 B1
(45) Date of Patent: Feb. 19, 2013

(54) SYSTEM AND METHOD FOR DAMPING OVERLOAD STATE OSCILLATIONS

(75) Inventors: Sohel R. Ahuja, Bellevue, WA (US); Jason G. McHugh, Seattle, WA (US)

(73) Assignee: Amazon Technologies, Inc., Reno, NV (US)

(*) Notice: Subject to any disclaimer, the term of this patent is extended or adjusted under 35 U.S.C. 154(b) by 147 days.

(21) Appl. No.: 13/069,118

(22) Filed: Mar. 22, 2011

(51) Int. Cl.
*G06F 15/173* (2006.01)

(52) U.S. Cl. ......... 709/225; 709/223; 709/224; 709/229

(58) Field of Classification Search .................. 709/223, 709/224, 225, 226, 227, 228, 229, 207, 203, 709/219; 370/235, 468; 718/105
See application file for complete search history.

(56) References Cited

U.S. PATENT DOCUMENTS

| | | | | |
|---|---|---|---|---|
| 6,836,785 | B1* | 12/2004 | Bakshi et al. | 709/224 |
| 2003/0028583 | A1 | 2/2003 | Flores et al. | |
| 2003/0046581 | A1 | 3/2003 | Call et al. | |
| 2003/0187998 | A1 | 10/2003 | Petit | |
| 2005/0273456 | A1 | 12/2005 | Revanuru et al. | |
| 2006/0056299 | A1 | 3/2006 | Menth et al. | |
| 2006/0135172 | A1 | 6/2006 | Dronne et al. | |
| 2006/0294228 | A1 | 12/2006 | Almstrom | |
| 2007/0121502 | A1 | 5/2007 | Donovan et al. | |
| 2007/0121673 | A1* | 5/2007 | Hammer | 370/468 |
| 2007/0124431 | A1* | 5/2007 | Sharma | 709/219 |
| 2008/0175152 | A1 | 7/2008 | Laselva et al. | |
| 2009/0122705 | A1* | 5/2009 | DeVal et al. | 370/235 |
| 2010/0103818 | A1* | 4/2010 | Griffith et al. | 370/235 |
| 2011/0153719 | A1* | 6/2011 | Santoro et al. | 709/203 |
| 2011/0161488 | A1* | 6/2011 | Anderson et al. | 709/224 |
| 2011/0161980 | A1* | 6/2011 | English et al. | 718/105 |
| 2011/0264778 | A1* | 10/2011 | McGregor et al. | 709/223 |
| 2011/0320555 | A1* | 12/2011 | Qiu et al. | 709/207 |
| 2012/0030341 | A1* | 2/2012 | Jensen et al. | 709/224 |

OTHER PUBLICATIONS

Lei Lu, et al., "AWAIT: Efficient Overload Management for Busy Multi-tier Web Services under Bursty Workloads," HP Laboratories, 2010, 16 pages.

Ervin Toth, et al., "Protection System Against Overload and Distributed Denial of Service Attacks," Int. J. Critical Computer-Based Systems, vol. 1, Nos. 1/2/3, 2010, Copyright © 2010 Inderscience Enterprises Ltd., 13 pages.

Ian Jenkins, "NGN Control Plane Overload and its Management," MultiSevice Forum, MSF Technical Report, MSF-TR-ARCH-007-FINAL, Feb. 2006, 11 pages.

(Continued)

*Primary Examiner* — Le H Luu

(74) *Attorney, Agent, or Firm* — Robert C. Kowert; Meyertons, Hood, Kivlin, Kowert & Goetzel, P.C.

(57) ABSTRACT

A computer system that provides services to clients may be configured to adaptively throttle incoming service requests. It may modify throttle parameters to aggressively increase throttling in response to detecting that the system is in an overloaded state. For example, a throttle multiplier value may be increased by a large amount in an attempt to quickly exit the overloaded state. The throttle multiplier value may be increased multiple times before the system exits the overloaded state. The percentage of incoming requests that are throttled and/or the particular requests that are throttled may be dependent on the throttle multiplier value and/or on a request priority rank. Some time after the system returns to a non-overloaded state, the system may gradually reduce throttling by iteratively decreasing the throttle multiplier value until it is zero. Gradually reducing throttling may allow the system to avoid oscillating between an overloaded state and a non-overloaded state.

30 Claims, 13 Drawing Sheets

OTHER PUBLICATIONS

Rosario G. Garroppo, et al., "Queueing Strategies for Local Overload Control in SIP Server," This full text paper was peer reviewed at the direction of IEEE Communications Society subject matter expers for publication in the IEEE "GLOBECOM" 2009 proceedings, 6 pages.

* cited by examiner

SYSTEM AND METHOD FOR DAMPING OVERLOAD STATE OSCILLATIONS

BACKGROUND

Every system that provides services to clients needs to protect itself from a crushing load of service requests that could potentially overload the system. In general, for a Web service or remote procedure call (RPC) service, a system is considered to be in an "overloaded" state if it is not able to provide the expected quality of service for some portion of client requests it receives. Common solutions applied by overloaded systems include denying service to clients or throttling a certain number of incoming requests until the systems get out of an overloaded state.

For example, a naïve solution may throttle incoming requests if the system is overloaded and may stop throttling once the system gets out of overloaded state. This implementation, however, can lead to an oscillatory behavior in which the system is able to exit an overloaded state by throttling incoming requests, but gets right back into the overloaded state once it removes the throttle.

Many current systems avoid an overload scenario by comparing the request rate and/or the quality of service perceived by the system itself with a fixed or varying global threshold and selectively refusing service to clients once this threshold has been crossed. However this approach does not take into account differences in the expectations of different clients regarding quality of service. In addition, it is difficult, if not impossible, to define a single global threshold that is meaningful (much less that provides acceptable performance) in a system that receives different types of requests at varying, unpredictable rates.

Figure 1:
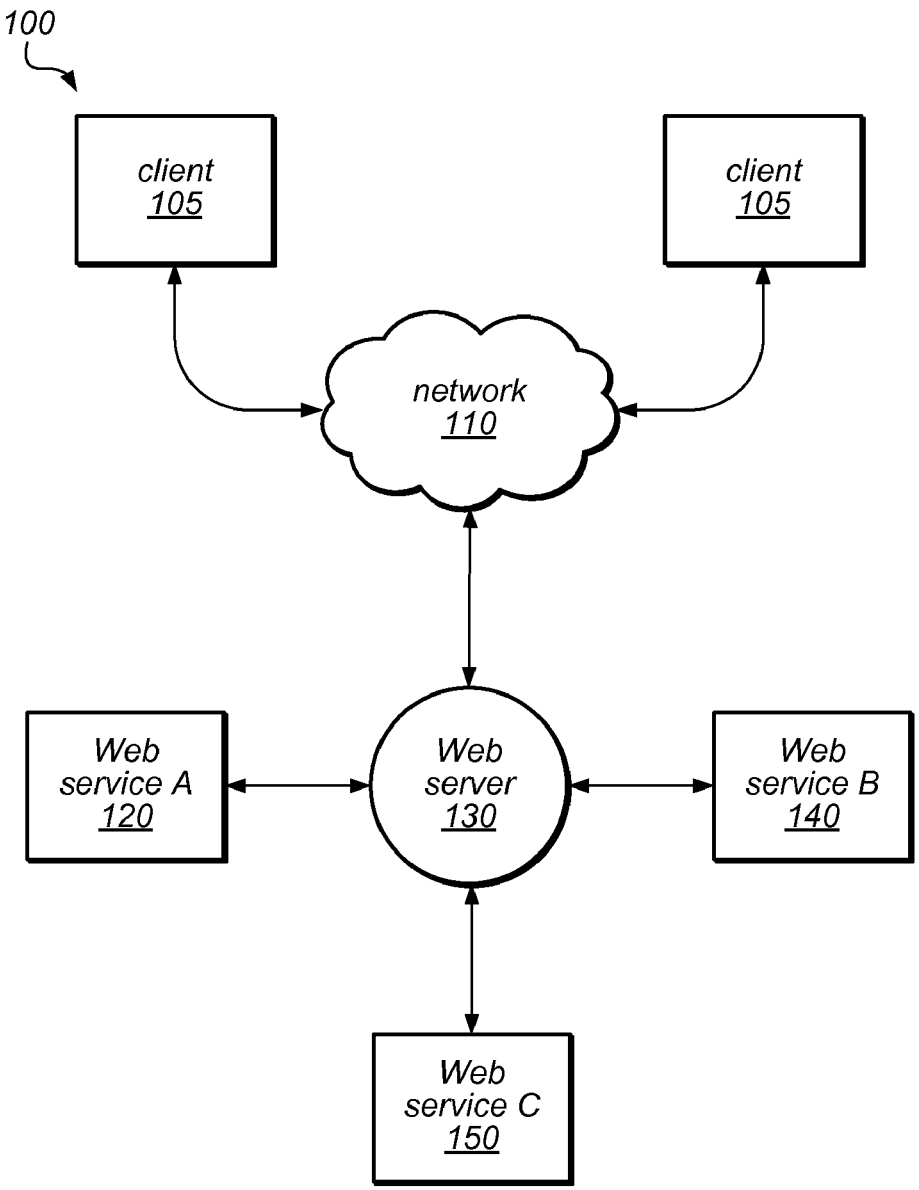
FIG. 1 is a block diagram illustrating components of a system that provides various Web-based services to clients, according to one embodiment.

While the technology described herein is susceptible to various modifications and alternative forms, specific embodiments thereof are shown by way of example in the drawings and will herein be described in detail. It should be understood, however, that the drawings and detailed description thereto are not intended to limit the disclosure to the particular form disclosed, but on the contrary, the intention is to cover all modifications, equivalents and alternatives falling within the spirit and scope of the present disclosure as defined by the appended claims.

DETAILED DESCRIPTION OF EMBODIMENTS

Introduction

The computer systems described herein for providing services to clients may in some embodiments be configured to adaptively throttle incoming service requests in response to changing conditions. The systems may modify one or more throttle parameters in order to aggressively increase throttling in response to detecting that the system is in an overloaded state. For example, a throttle multiplier value may be increased by a large amount in an attempt to quickly exit the overloaded state. The throttle multiplier value may be increased multiple times before the system exits the overloaded state. In some embodiments, the percentage of incoming requests that are throttled and/or the particular requests that are throttled may be dependent on the throttle multiplier value and/or on the client-specific priority rank of each request.

In some embodiments, in response to the system returning to a non-overloaded state (e.g., as a result of aggressive throttling), it may gradually reduce throttling by iteratively decreasing the throttle multiplier value until it is zero (or until the system returns to the overloaded state). The amounts by which the throttle multiplier may be increased and/or decreased in order to aggressively throttle service requests or gradually reduce throttling may be configurable. Gradually reducing throttling may in some embodiments allow the system to damp or avoid oscillations between an overloaded state and a non-overloaded state when modifying the throttle multiplier or other throttle parameters.

In some embodiments, the systems described herein may be configured to adaptively throttle incoming service requests in order to reach and then maintain operation at an ideal request rate. In some embodiments, an ideal request rate may be defined as the maximum rate at which incoming service requests can be accepted and serviced such that client-specified quality of service (QoS) expectations are met for all (or a targeted high percentage of) incoming service requests that are accepted and serviced. In other embodiments, an ideal request rate may be defined as any request rate within a pre-defined range of request rates that includes the maximum rate at which incoming service requests can be accepted and serviced such that client-specified quality of service (QoS) expectations are met for all (or a targeted high percentage of) incoming service requests that are accepted and serviced. For example, an ideal request rate range may in some embodiments be centered about the maximum request rate at which expectations are met for all (or a targeted high percentage) of requests. Note that the width of the range of request rates that are considered acceptable for inclusion in an ideal request rate range may be defined by a default system parameter value or by a client-specified default parameter value, and/or it may be configurable at initiation or during runtime, in various embodiments. In some embodiments, an ideal request rate range may have as its upper or lower bound the maximum request rate at which expectations are met for all (or a targeted high percentage) of requests. Note that the maximum request rate at which QoS expectations are met for all (or a targeted high percentage) of requests may sometimes be referred to herein as the "absolute ideal request rate".

Determining whether the system is operating at an ideal request rate may include determining the minimum difference between the expected QoS and the actual QoS for a group of recently serviced requests. The system may gradually modify a throttle multiplier value (and/or another throttle parameter) in order to reach or maintain an ideal request rate. Maintaining operation at an ideal request rate may allow the system to avoid entering an overloaded state, and/or to avoid oscillating between an overloaded state and a non-overloaded state. Note that in some embodiments, maintaining operation at an ideal request rate may include continuously and/or periodically evaluating the minimum difference between the expected and actual QoS for serviced requests and, as appropriate, adjusting a throttle multiplier or other throttle parameter in an ongoing attempt to reach the absolute ideal request rate, whether it is physically possible to achieve this exact request rate or not. However, such potentially constant adjustment may not be practical, in some embodiments. Therefore, in some embodiments, maintaining operation at an ideal request rate may include adjusting a throttle multiplier or other throttle parameter only as needed to maintain operation within an acceptable ideal request rate range, as described herein.

In some embodiments, the systems described herein may be configured to determine whether they are operating in an overloaded state based on the percentage of client-specified QoS expectations that are not met, rather than on a single global performance threshold. For example, if the percentage of service requests in a group of recently serviced requests for which client-specified expectations of a maximum response time were not met is greater than a pre-determined overload threshold, a system may be considered to be in an overloaded state. The overload threshold may be configurable, in some embodiments.

In some embodiments, the overload state of a system may be determined periodically by determining the percentage of service requests in a moving window of time for which client-specified QoS expectations were not met. As noted above, in response to determining that the system is operating in an overloaded state, it may be configured to throttle at least a portion of incoming service requests in an attempt to exit the overloaded state.

Various techniques described herein may be employed in local or remote systems, including systems that provide services to users (e.g., subscribers) over the Internet or over other public or private networks, such as virtual private networks and connections to services in a virtual private cloud (VPC) environment. FIG. 1 illustrates a block diagram of a system that provides various Web-based services to clients, according to one embodiment. In this example, system 100 includes one or more clients 105. In this example, the clients 105 may be configured to interact with a Web server 130 via a communication network 110.

Figure 2:
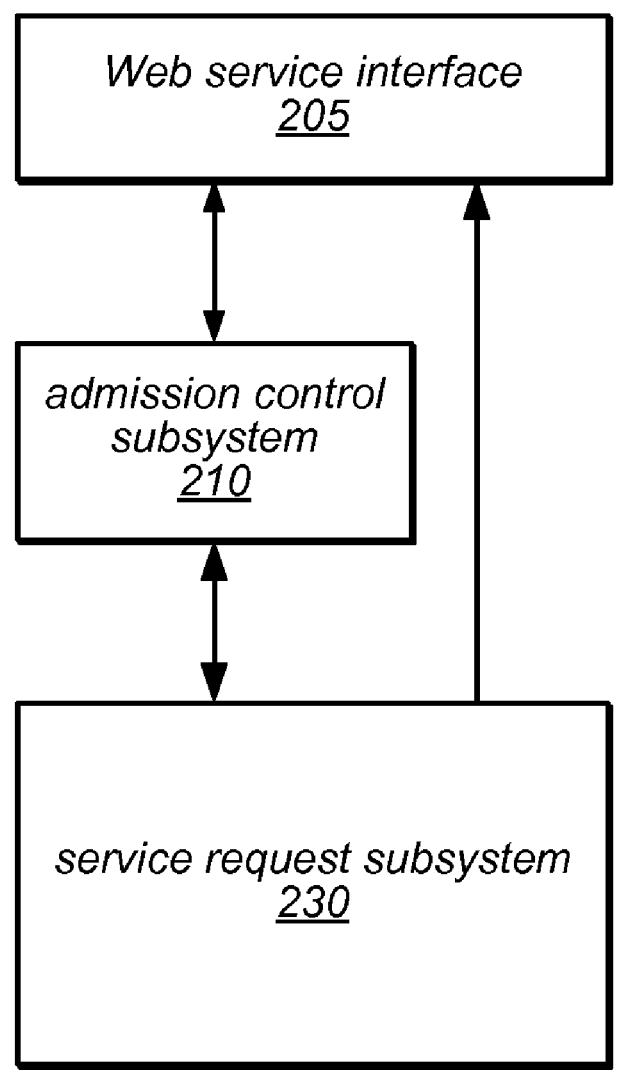
FIG. 2 is a block diagram illustrating subsystems of a system that provides various Web-based services to clients, according to one embodiment.

As illustrated in this example, the Web server 130 may be configured to process requests from clients 105 for various services, such as Web service A (120), Web service B (140), and Web service C (150), and to return results to the clients 105. As described in more detail herein, in various embodiments, a component of Web server 130 may be configured to determine whether computing system, such as computing system 200 in FIG. 2, is operating in an overloaded state with respect to the number and/or rate of requests for service that are directed to the system, and/or to apply one or more of the techniques described herein to respond to such a determination, to move the system out of an overloaded state, to throttle or increase the number of requests that are accepted or serviced, to avoid oscillating between an overloaded state and a non-overloaded state, to prevent a subsequent return to an overloaded state, or to service requests at an ideal request rate. For example, in some embodiments, an admission control subsystem, such as admission control subsystem 210 in FIG. 2, may be configured to monitor the performance of computing system 200 with respect to the servicing client requests, and may control which and how many service requests are accepted and/or serviced by the system in order to maintain an acceptable level of availability and/or consistency in the system. Computing system 200 and admission control subsystem 210 in FIG. 2 are described in more detail below.

In the example illustrated in FIG. 1, the clients 105 may encompass any type of clients configured to submit service requests to Web server 130 via network 110 on behalf of a user or a requesting application. For example, a given client 105 may include a suitable version of a Web browser, or a plug-in module or other type of code module configured to execute as an extension to or within an execution environment provided by a Web browser. Alternatively, a client 105 may encompass an application such as a database application, media application, office application, or any other application that may make use of the services provided by Web server 130. In some embodiments, such an application may include sufficient protocol support (e.g., for a suitable version of Hypertext Transfer Protocol (HTTP)) for generating and processing Web service requests without necessarily implementing full browser support for all types of Web-based data. That is, client 105 may be an application configured to interact directly with Web server 130. In various embodiments, client 105 may be configured to generate requests for Web services according to a Representational State Transfer (REST)-style Web services architecture, a document or message-based Web services architecture, or another suitable Web services architecture. In some embodiments, client 105 may be configured to provide access to Web-based service to other applications in a manner that is transparent to those applications. For example, a client 105 may be configured to integrate with an operating system to provide services in accordance with a suitable variant of the service model described herein. However, the operating system may present a different service request interface to applications than that described herein.

In various embodiments, the communication network 110 may encompass any suitable combination of networking hardware and protocols necessary to establish Web-based communications between clients 105 and Web server 130. For example, the communication network 110 may generally encompass the various telecommunications networks and service providers that collectively implement the Internet. The communication network 110 may also include private networks such as local area networks (LANs) or wide area networks (WANs) as well as public or private wireless networks. For example, both a given client 105 and the Web server 130 may be respectively provisioned within enterprises having their own internal networks. In such an embodiment, the communication network 110 may include the hardware (e.g., modems, routers, switches, load balancers, proxy servers, etc.) and software (e.g., protocol stacks, accounting software, firewall/security software, etc.) necessary to establish a networking link between the given client 105 and the Internet as well as between the Internet and Web server 130. Note that in some embodiments, clients 105 may communicate with Web server 130 using a private network rather than the public Internet. For example, in some embodiments clients 105 may be provisioned within the same enterprise as the resources that provide various services to those clients. In such a case, clients 105 may communicate with a server 130 entirely through a private communication network (not shown).

FIG. 2 is a block diagram illustrating a computing system 200 that provides various Web-based services to clients, according to some embodiments. For example, in some embodiments, computing system 200 may implement a Web server, such as Web server 130 illustrated in FIG. 1. In various embodiments, computer system 200 maybe configured to allocate a variety of resources (which may include, for example, downstream services, database connections, input/output channels, computational resources, execution threads, a portion of system memory, disk memory or other persistent storage resources, or any other constrained resources) from one or more pools of resources to service requests received by computing system 200 in order to provide services requested by various clients. As illustrated in this example, computing system 200 may include a Web service interface 205, an admission control subsystem 210, and a service request subsystem 230.

In this example, Web services interface 205 may be configured to receive requests for services from various clients and to communicate with admission control subsystem 210 to facilitate the performance of those services on behalf of the clients. For example, in some embodiments, admission control subsystem 210 may be configured to determine which and/or how many service requests to accept from various clients, and may communicate with a service request subsystem 230 to accept and/or service one or more received service requests. Service request subsystem 230 may in turn be configured to allocate (or initiate allocation of) one or more resources needed to perform the requested services to those requests, and to return results to the client via Web services interface 205. In some embodiments, admission control system 210 may make decisions about admission control based on feedback received from request subsystem 230. In various embodiments, this feedback may be in-band/implicit feedback (e.g., in terms of actual response times of serviced requests, or other QoS levels achieved) or may be out-of-band/explicit feedback. In some embodiments, Web service interface 205 may utilize predefined instructions or communications, such as via defined application protocol interfaces (APIs), to communicate with admission control subsystem 210 and/or other components of computing system 200 on behalf of a client.

In some embodiments, admission control subsystem 210 may be configured to determine whether computing system 200 is operating in overloaded state with respect to the number and/or rate of requests for service that are directed to the system, and/or to apply one or more of the techniques described herein to respond to such a determination, to move the system out of an overloaded state, to throttle or increase the number of requests that are accepted or serviced, to avoid oscillating between an overloaded state and a non-overloaded state, to prevent a subsequent return to an overloaded state, or to service requests at an ideal request rate. For example, in some embodiments, admission control subsystem 210 may be configured to monitor the performance of computing system 200 with respect to the servicing of client requests, and may control which and how many service requests are accepted and/or serviced by the system in order to maintain an acceptable level of availability and/or consistency in the system.

Note that in various embodiments, the components illustrated in FIGS. 1 and 2 may be implemented directly within computer hardware, as instructions directly or indirectly executable by computer hardware (e.g., a microprocessor or computer system), or as a combination of these techniques. For example, the components of the computing system 200 may be implemented by a distributed system including any number of computing nodes (or simply, nodes). In various embodiments, the functionality of a given component may be implemented by a particular node or distributed across several nodes. In some embodiments, a given node may implement the functionality of more than one of the component illustrated in FIG. 1 and/or FIG. 2.

Various techniques that may be implemented by a Web server (or an admission control subsystem or other component thereof) are described in more detail below, according to different embodiments. In general, any or all of the techniques described herein for managing the processing of service requests on behalf of clients may be performed by and/or implemented in an admission control module that is a component of a Web server. While several examples described herein are directed to systems that provide services over the Internet, in other embodiments, these techniques may be performed by and/or implemented in an admission control module or a similar component of another type of system that provides services to clients, and that is configured to receive, accept, and/or service requests on behalf of those clients.

As noted above, a common solution applied by overloaded systems is to deny service to or throttle a certain number of incoming requests until the systems exits the overloaded state. In contrast to this naïve throttling solution, in which a system merely throttles incoming requests if the system is overloaded and stops throttling incoming requests once the system exits the overloaded state, the techniques described herein may allow a system to avoid an oscillatory behavior in which the system is able to exit an overloaded state by throttling incoming requests, but goes right back into the overloaded state once it removes the throttle. The adaptive throttling techniques described herein may instead attempt to damp oscillations by aggressive throttling and slow release. In other words, the systems describe herein may employ adaptive techniques for request throttling that may damp oscillations between an overloaded state and a non-overloaded state. These adaptive throttling techniques may modify one or more throttle parameters to apply aggressive throttling to quickly exit an overloaded state (once it is detected), and then may slowly reduce the amount of throttling in the system to avoid oscillating between overload and non-overloaded states.

For example, in some embodiments, the system may be configured to detect that the system is overloaded with respect to incoming service requests, and, in response, to aggressively throttle incoming requests in an attempt to exit the overloaded state as quickly as possible (e.g., before a crushing load causes a system failure). In such embodiments, once the system is no longer operating in an overloaded state, it may be configured to gradually reduce the amount of throttling to avoid oscillating between overloaded and non-overloaded states. In some embodiments, the system may adjust one or more parameters that control the amount and/or type of throttling in the system to aggressively throttle requests in response to detecting an overload condition, and then to further modify them in order to incrementally reduce throttling once the system is no longer in an overloaded state. For example, in some embodiments, the system may employ a throttle multiplier that may be aggressively or coarsely incremented, and then gradually or finely tuned in order to damp overload state oscillations.

In some embodiments, when an overloaded state is detected, a throttle multiplier may be incremented, which may cause the system to increase the percentage of incoming service requests that are throttled. For example, the value of the throttle multiplier may be increased by a large amount in response to detecting that the system is operating in an overloaded state in order to more aggressively throttle incoming requests. In some embodiments, the value of the throttle multiplier may be increased to a value that is likely to increase throttling by an amount that is aggressive enough to cause the system to return to a non-overloaded state. In some embodiments, a throttle multiplier may need to be incremented multiple times if a first attempt to increase throttling enough to exit the overloaded state is unsuccessful.

In some embodiments, once the system returns to a non-overloaded state (e.g., as a result of aggressive throttling), the system may be configured to gradually reduce the amount of throttling until the throttle multiplier value is zero, in which case all subsequent incoming requests may be accepted and serviced, or until the system returns to an overloaded state. In some embodiments, the system may be configured to wait until a pre-determined amount of time has passed following the return of the system to a non-overloaded state before it begins to reduce throttling. In other embodiments, the system may perform a pre-determined number of evaluations of the overload state (e.g., by periodically polling the performance of the system) before it begins to reduce throttling.

Figure 3:
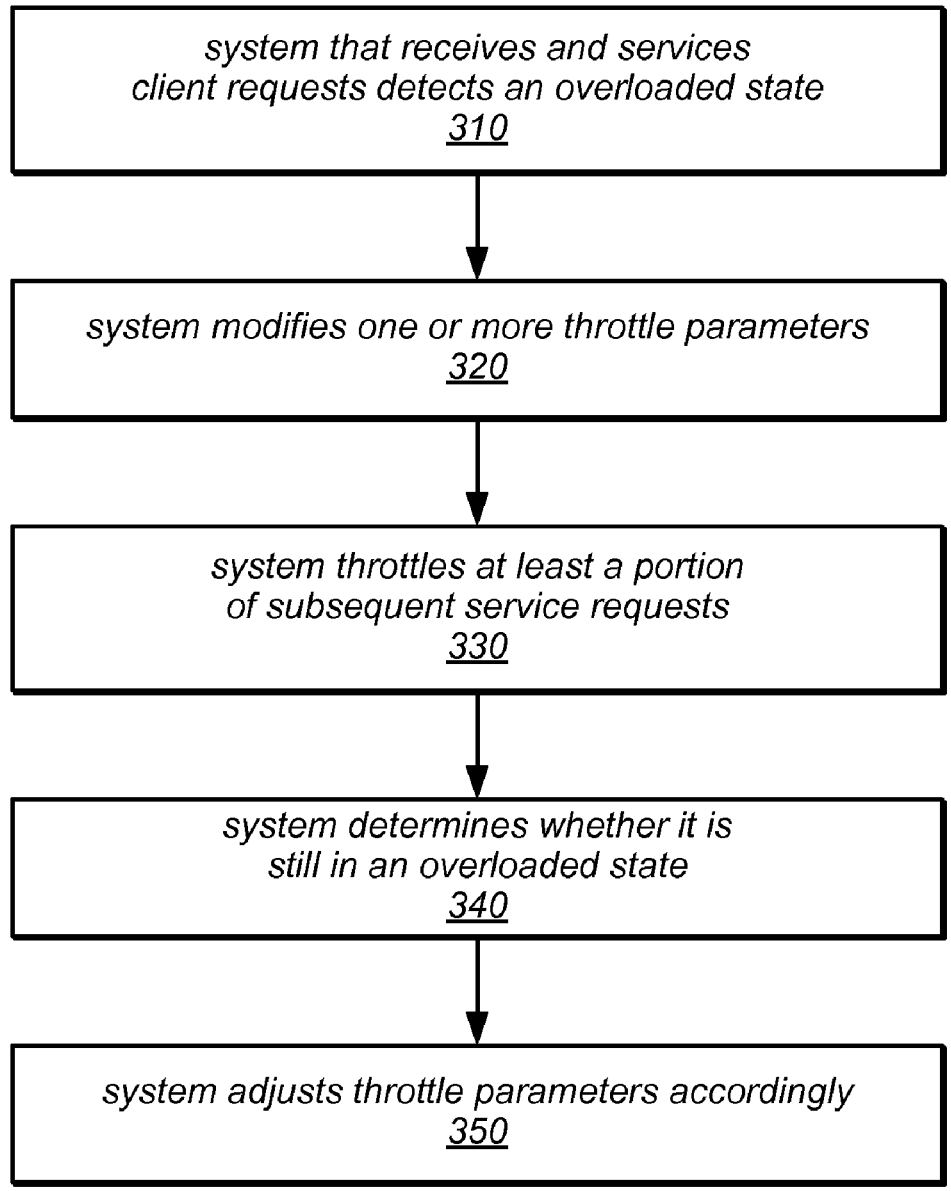
FIG. 3 is a flow diagram illustrating a method for damping oscillations between an overloaded state and a non-overloaded state in a system that receives and services client requests, according to one embodiment.

One embodiment of a method for damping oscillations between an overloaded state and a non-overloaded state in a system that receives and services client requests is illustrated by the flow diagram in FIG. 3. As illustrated at 310 in this example, the method may include the system detecting that it is operating in overloaded state. In different embodiments, the system may employ any of various methods and/or criteria for determining that it is an overloaded state, including comparing a request rate or quality of service measurement with a fixed target, or using one or more of the techniques described herein for determining that the system is operating in overloaded state dependent on client-specified or client-specific expectations of quality of service (QoS). In response to detecting that the system is operating in overloaded state, the method may include the system modifying one or more throttle parameters in an aggressive attempt to exit the overloaded state, as in 320. This may cause the system to throttle at least a portion of subsequent service requests, as in 330. In various embodiments, throttling service requests may include rejecting (i.e. failing to accept or acknowledge) service requests directed to the system, or failing to service requests received by the system. In some embodiments, throttling may include sending an indication to one or more clients that the system is in an overloaded state and/or that they should reduce the number and/or rate of service requests that they direct to the system. Other types of request throttling may be employed in other embodiments.

In some embodiments, after aggressively throttling service requests in an attempt to exit the overloaded state, the system may be configured to determine whether the system is still in an overloaded state, as in 340. For example, in some embodiments, the system may be configured to sample the performance of the system with respect to servicing client requests, or to periodically poll the system to determine whether it is still in an overloaded state. The system may then adjust one or more throttling parameters accordingly, as in 350. For example, the system may be configured to increase or decrease a throttle multiplier, depending on whether or not the system is still in an overloaded state, and to do so in a way that avoids oscillating between overloaded and non-overloaded states. Such adjustments are described in more detail below.

As noted above, in some embodiments, determining the percentage of incoming requests that should be throttled may be dependent on the value of a throttle multiplier. In some such embodiments, the throttle multiplier may be initialized (e.g., at bootstrap) to a value of zero, which may cause the system to service every request that it receives. In the event that an overload is detected, the system may increment the throttle multiplier by a pre-determined value, and begin aggressively throttling a percentage of incoming service requests. For example, in one embodiment, if the value of the throttle multiplier was initialized to zero and then increased by a pre-determined value, T, the system may begin to throttle T % of all incoming requests. The system may poll its state periodically (e.g., evaluating its performance in servicing incoming requests at fixed time intervals) to determine its overloaded state. If the system is still overloaded after the initial increment of the throttle multiplier, the system may be configured to further increase the throttle multiplier value (e.g., again by T) and to begin throttling 2T % of all incoming requests. In some embodiments, the system may be configured to continue increasing the throttle multiplier (e.g., by T) after every poll interval until the system exits the overloaded state.

In some embodiments, the amount of throttling may be dependent on a priority rank associated with each request (e.g., a client-specified or type-specific priority rank), in addition to being dependent on a throttle multiplier. In such embodiments, when the system increases the throttle multiplier from zero to T, it may being throttling (T×P) % of all incoming requests, where P is the request priority rank, and high priority requests have a low priority rank. In such embodiments, the system may be configured to throttle high priority requests at a lower rate than the rate at which it throttles low priority requests. As in the previous example, the system may poll its state periodically (e.g., evaluating its performance in servicing incoming requests at fixed time intervals) to determine its overloaded state. For example, in some embodiments, only the requests that have been received within the most recent time interval are considered when evaluating the performance of the system in servicing incoming requests. In other embodiments, such an evaluation may be performed at fixed time intervals, but each evaluation instance may consider requests that were received within multiple time intervals (e.g., to evaluate and/or detect changes in the cumulative performance of the system over multiple time intervals). If the system is still overloaded after the initial increment of the throttle multiplier, the system may be configured to further increase the throttle multiplier value (e.g., again by T) and to begin throttling (2T×P) % of all incoming requests. Again, the system may be configured to continue increasing the throttle multiplier (e.g., by T) after every poll interval until the system exits the overloaded state.

Once the system has been in a non-overloaded state for a pre-determined number of consecutive poll intervals, the system may begin releasing the throttle. For example, the system may reduce the throttle multiplier by a different pre-determined amount than the amount by which the throttle multiplier was incrementally increased in order to exit the overloaded state (e.g., a value R, where R<<T) in every consecutive non-overloaded interval. In this way, the system may avoid going back to the overloaded state, while accepting that this may come at the expense of reduced system throughput. As noted above, the system may continue to reduce the throttle rate until the throttle multiplier value is zero, or until the system returns to the overloaded state, in which case the throttle multiplier may again be increased by T.

Note that in some embodiments, the throttle multiplier may be initialized to a value other than zero (e.g., to a default or client-specified value that is deemed likely to result in acceptable performance based on historical workloads and/or performance measurements). In such embodiments, if the system enters an overloaded state, it may employ the adaptive throttling techniques described herein (e.g., aggressively increasing the value of the throttle multiplier until the system exits the overloaded state, and then gradually reducing it) in order to avoid oscillating between an overloaded state and a non-overloaded state. In some such embodiments, the throttle multiplier may be reduced until it reaches its initial value, rather than a value of zero.

Figure 4:
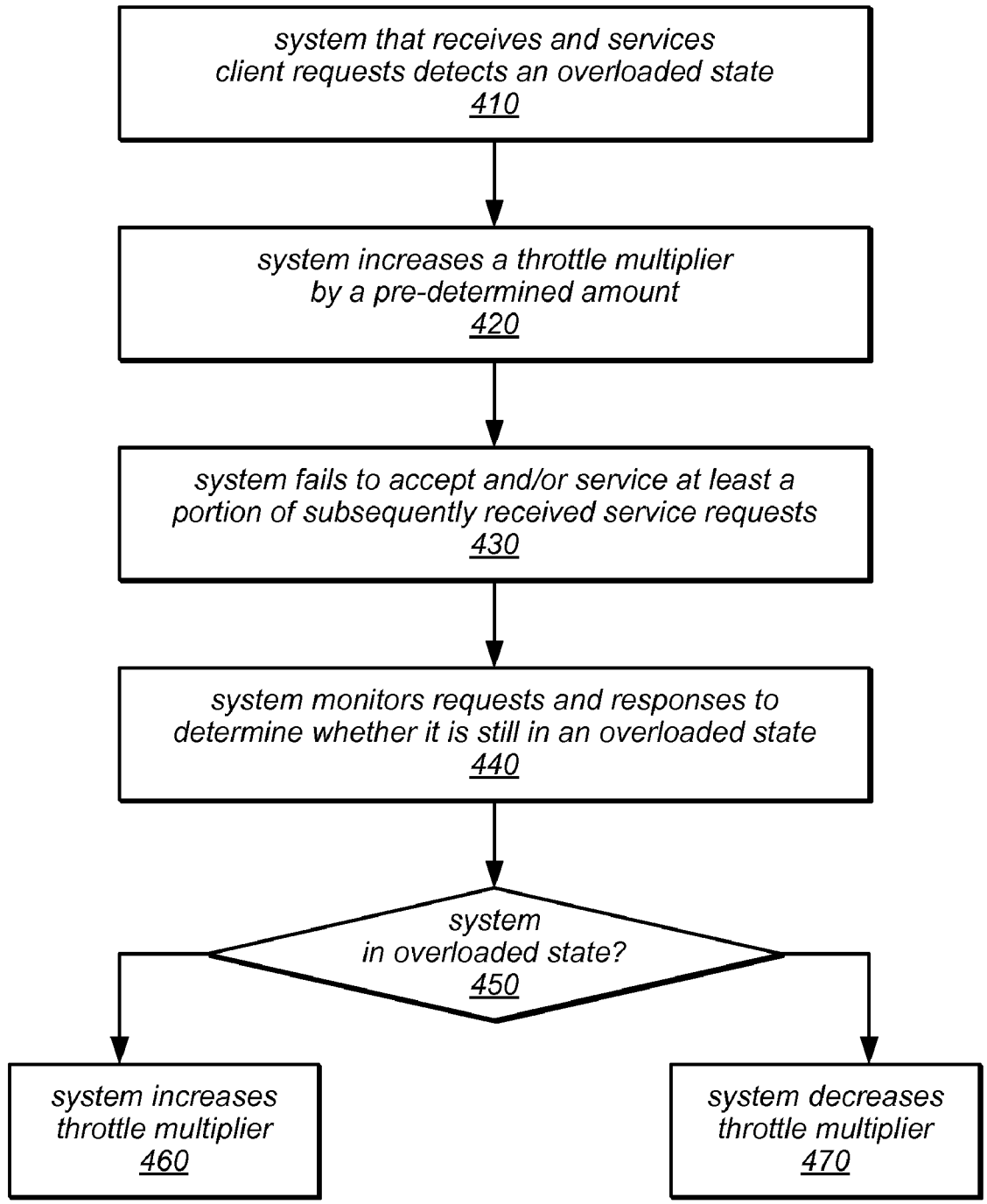
FIG. 4 is a flow diagram illustrating a method for adjusting a throttle parameter to avoid oscillating between overloaded states and non-overloaded states, according to one embodiment.

One embodiment of a method for adjusting a throttle parameter to avoid oscillating between overloaded and non-overloaded states is illustrated by the flow diagram in FIG. 4. As illustrated in this example, the method may include a computing system that provides various services to clients (i.e. that receives and services client requests) detecting that it is operating in an overloaded state, as in 410. In different embodiments, the system may employ any of various methods and/or criteria for determining that it is an overloaded state, including comparing a request rate or quality of service measurement with a fixed target, or using one or more of the techniques described herein for determining that the system is in an overloaded state dependent on client-specified or client-specific expectations of QoS.

As illustrated in this example, the method may include, in response to detecting that the system is in an overloaded state, the system increasing a throttle multiplier (e.g., from a default, initial, or zero value) by a pre-determined (and possibly large) amount, as in 420. For example, the throttle multiplier may be increased by an amount that, based on current and/or historical loads and system performance, may be likely to cause the system to exit the overloaded state. Increasing the throttle multiplier may cause the system to throttle at least a portion of subsequent service requests, as in 430. In various embodiments, throttling service requests may include rejecting (i.e. deliberately failing to accept or acknowledge) service requests directed to the system, or deliberately failing to service requests received by the system. In some embodiments, throttling may include sending an indication to one or more clients that the system is in an overloaded state and/or that they should reduce the number and/or rate of service requests that they direct to the system. Other types of throttling may be employed in other embodiments. Note that in various embodiments, victim selection (i.e. the determination of which requests are rejected and which requests are accepted and/or serviced) may be dependent on a request priority rank and/or on an expected QoS value (either of which may be specified in the requests themselves), as described herein, or may be dependent on other criteria.

As illustrated at 440, in this example, the method may include the system monitoring service requests and response thereto to determine whether the system is still in an overloaded state following the increase in the throttle multiplier. For example, the system may perform periodic sampling, polling, or other types of monitoring operations to determine the value of various performance measures related to the servicing of client request, such as how often an expected QoS value is (or is not) being met. For example, in some embodiments, only the requests that have been received within a most recent time window are considered when evaluating the performance of the system in meeting QoS expectations. In other embodiments, such an evaluation may be performed at fixed time intervals, but each evaluation instance may consider requests that were received within multiple time windows (e.g., to evaluate and/or detect changes in the cumulative performance of the system over multiple time windows). If the system is determined to be in an overloaded state, shown as the positive exit from 450, the method may include the system increasing the throttle multiplier, as in 460. For example the throttle multiplier may be increased by the same amount as the initial amount by which it was increased in an aggressive attempt to exit the overloaded state, or some another, less aggressive, incremental amount, in different embodiments. If it is determined that the system is not in an overloaded state, shown as the negative exit from 450, the method may include the system decreasing the throttle multiplier, as in 470. For example, the throttle multiplier may be decreased by an incremental amount (e.g. by an amount that is less than the current throttle multiplier value or the amount by which is was previously increased).

As previously noted, by aggressively throttling requests when a system is operating in an overloaded state, and then slowly or incrementally reducing throttling once the system is no longer in an overloaded state, the system may avoid oscillating between overloaded and non-overloaded states, effectively damping the response of the system to changes in the load and corresponding changes in the amount of throttling applied to service requests. One embodiment of a method for adjusting a throttle multiplier to implement such a damping technique is illustrated by the flow diagram in FIG. 5. As illustrated in this example, the method may include a computing system that provides various services to clients (i.e. that receives and services client requests) initializing a throttle multiplier to zero, as in 510. In this example, setting the throttle multiplier to zero may result in all service requests being accepted and serviced until or unless the throttle multiplier is subsequently changed or the system fails.

In this example, in response to the system detecting an overloaded state, as in 520, the method may include the system increasing the throttle multiplier by a pre-determined amount (e.g., a large amount selected in an attempt to aggressively throttle service requests and exit the overloaded state), as in 530. For example, in different embodiments, the system may employ any of various methods and/or criteria for determining that it is an overloaded state, including comparing a request rate or quality of service measurement with a fixed target, or using one or more of the techniques described herein for determining that the system is in an overloaded state dependent on client-specified or client-specific expectations of QoS.

Figure 5:
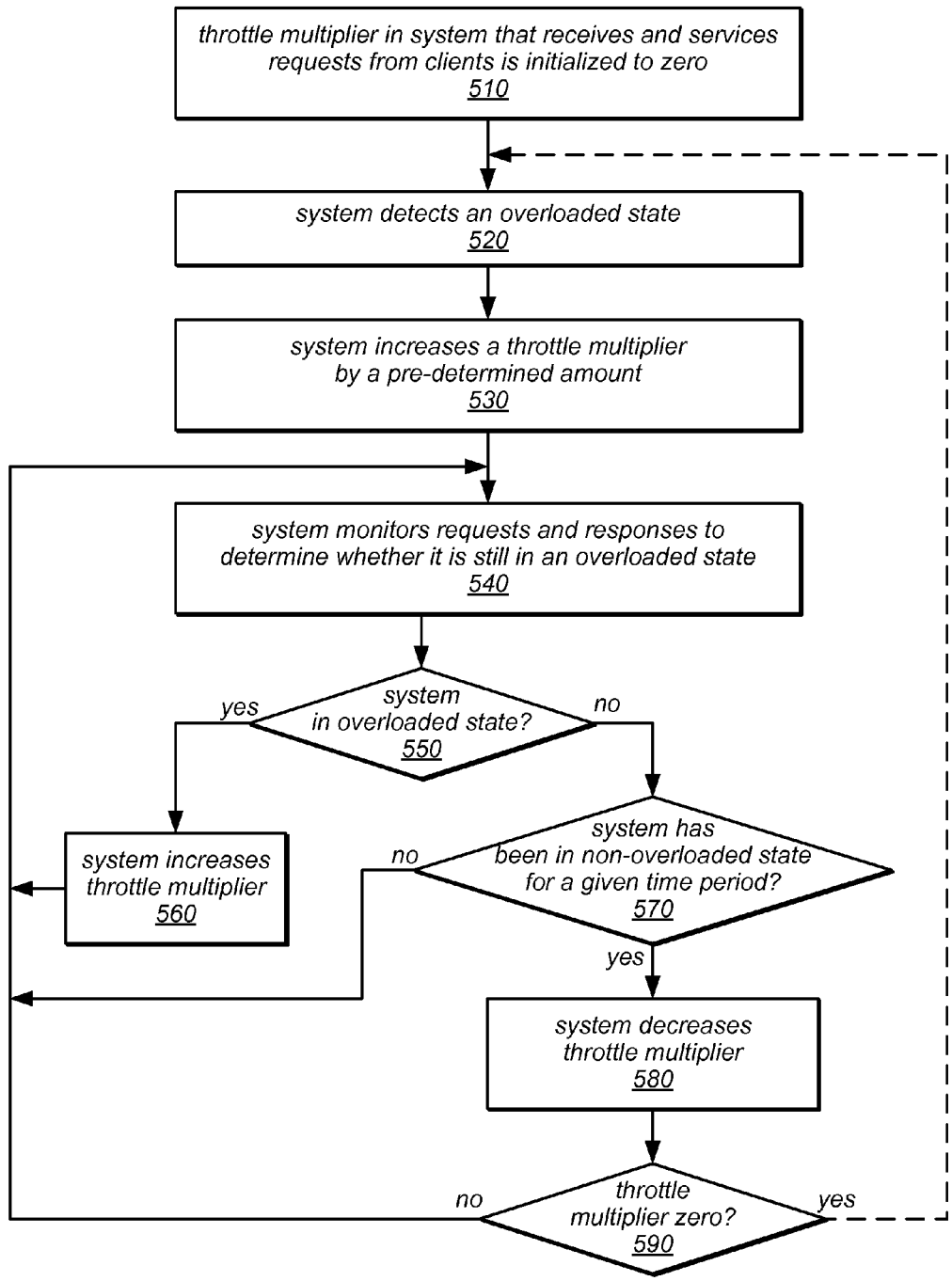
FIG. 5 is a flow diagram illustrating a method for adjusting a throttle multiplier to implement a damping technique, according to one embodiment.

As illustrated in this example, the method may include the system monitoring service requests and response thereto to determine whether the system is still in an overloaded state following the increase in the throttle multiplier, as in 540. For example, the system may perform periodic sampling, polling, or other types of monitoring operations to determine the value of various performance measures related to the servicing of client request, such as how often an expected QoS value is (or is not) being met. For example, in some embodiments, only the requests that have been received within a most recent time window are considered when evaluating the performance of the system in meeting QoS expectations. In other embodiments, such an evaluation may be performed at fixed time intervals, but each evaluation instance may consider requests that were received within multiple time windows (e.g., to evaluate and/or detect changes in the cumulative performance of the system over multiple time windows). If the system is determined to be in an overloaded state, shown as the positive exit from 550, the method may include the system increasing the throttle multiplier, as in 560. For example the throttle multiplier may be increased by the same amount as the initial amount by which it was increased in an aggressive attempt to exit the overloaded state, or some another, less aggressive, incremental amount, in different embodiments. After increasing the throttle multiplier, the method may include continuing to monitor service requests and response thereto to determine whether the system is still in an overloaded state following the additional increase in the throttle multiplier. This is illustrated in FIG. 5 as the feedback from 560 to 540. If the system is still in an overloaded state following the additional increase in the throttle multiplier, the operations illustrated in FIG. 5 as 550 to 590 may be repeated, as applicable.

If it is determined that the system is not in an overloaded state, shown as the negative exit from 550, and if the system has been in a non-overloaded state for a given time period, shown as the positive exit from 570, the method may include the system decreasing the throttle multiplier, as in 580. For example, the throttle multiplier may be decreased by an incremental amount (e.g. by an amount that is less than the current throttle multiplier value or the amount by which it was previously increased). Otherwise, shown as the negative exit from 550 and the negative exit from 570, the method may include the system decreasing the throttle multiplier, as in 580. In other words, in some embodiments, after increasing the throttle multiplier to aggressively throttle service requests and then determining that the system is no longer in an overloaded state, the system may not begin to back off of its aggressive throttling until the system has been in non-overloaded state for a given time period (e.g., for a given number of samples, or time periods over which overloaded state is determined, according to various embodiments).

As illustrated in FIG. 5, if the value of the throttle multiplier is not zero following the decrease, shown as the negative exit from 590, the operations illustrated as 540-590 may be repeated until the throttle multiplier is zero (shown as the positive exit from 590) or until the system returns to an overloaded state (shown as the positive exit from 550). However, by slowly and/or incrementally reducing the amount of throttling in the system, such state oscillations may be avoided or their frequency reduced. Note that if the throttle multiplier is reduced to zero, shown as the positive exit from 590, the system may accept and service all incoming client requests until and unless the system detects that the system has returned to an overloaded state, at which point the operations illustrated as 520 to 590 may be repeated, as applicable. This is illustrated in FIG. 5 by the dashed feedback line from 590 to 520.

As noted above, a common solution applied by overloaded systems is to deny service to or throttle a certain number of incoming requests until the systems exits the overloaded state. In some embodiments, the systems described herein may make use of the concept of an "ideal request rate" to ensure that the system does not go into an overloaded state (or at least avoids going into an overloaded state) while still achieving close to optimum throughput. In such embodiments, the system may attempt to avoid entering an overloaded state in the first place by only accepting requests that it can satisfy (which may come at the cost of reduced throughput). As used herein the term "ideal request rate" may refer to the maximum rate at which incoming service requests can be accepted and serviced such that client-specified quality of service expectations are met for all (or a targeted large percentage) of incoming service requests that are accepted and serviced (i.e. the absolute ideal request rate), or any request rate within a pre-determined range of request rates that includes such an absolute ideal request rate, in different embodiments. In some embodiments, an ideal request rate range may have as its upper or lower bound the maximum rate at which incoming service requests can be accepted and serviced such that client-specified quality of service expectations are met for all (or a targeted large percentage) of incoming service requests. In general, an ideal request rate may be thought of as a rate of incoming requests to a service at which every request (or a targeted large percentage thereof) is satisfied with its expected quality of service, and the difference between the expected and actual quality of service is close to zero. For example, in some embodiments this difference may be maintained as close as is possible (or practical) to a pre-determined threshold near zero without being significantly above or below that threshold.

In some embodiments, once a system enters an overloaded state, it may aggressively begin throttling incoming requests until it exits the overloaded state. Once the system is out of the overloaded state, it may start easing back on the throttle, making sure that it continues to satisfy every request it accepts with the expected quality of service. Specifically, the system may keep track of the minimum difference between the expected and actual quality of service (e.g., for requests received within a moving window in time) and may keep reducing the throttle until the minimum difference becomes equal to a pre-determined ideal request rate threshold (e.g., a default or client-specified threshold value that is close to zero). When the system is operating at an ideal request rate, it may achieve (or be operating close to) the maximum throughput possible while barely meeting QoS expectations for all (or a targeted high percentage) of incoming requests. Once the system reaches an ideal request rate, it may try to maintain operation at an ideal request rate according to the ideal request rate threshold, e.g., by increasing throttling if the minimum difference between the expected and actual quality of service decreases or becomes negative, and decreasing throttling if the minimum difference between the expected and actual quality of service increases.

Figure 6:
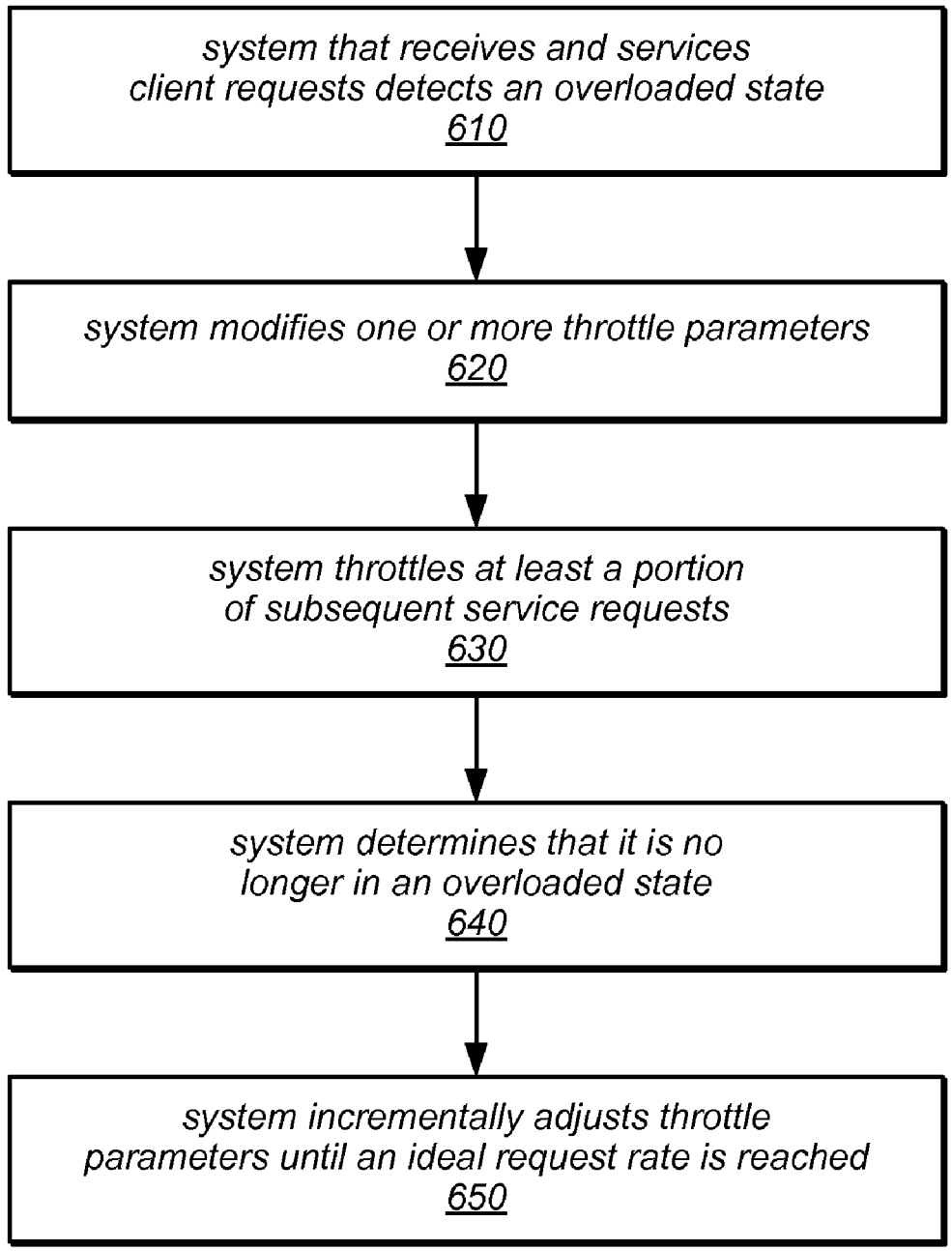
FIG. 6 is a flow diagram illustrating a method for using an ideal request rate to avoid oscillating between an overloaded state and a non-overloaded state, according to one embodiment.

One embodiment of a method for using an ideal request rate to avoid oscillating between an overloaded state and a non-overloaded state in a system that receives and services client requests is illustrated by the flow diagram in FIG. 6. As illustrated at 610 in this example, the method may include the system detecting that it is operating in an overloaded state. In different embodiments, the system may employ any of various methods and/or criteria for determining that it is an overloaded state, including comparing a request rate or quality of service measurement with a fixed target, or using one or more of the techniques described herein for determining that the system is in an overloaded state dependent on client-specified or client-specific expectations of QoS. In response to detecting that the system is in an overloaded state, the method may include the system modifying one or more throttle parameters in an aggressive attempt to exit the overloaded state, as in 620. For example, the system may increase the value of a throttle multiplier, which may cause the system to throttle at least a portion of subsequent service requests, as in 630. In various embodiments, throttling service requests may include rejecting (i.e. failing to accept or acknowledge) service requests directed to the system, or failing to service requests received by the system. In some embodiments, throttling may include sending an indication to one or more clients that the system is in an overloaded state and/or that they should reduce the number and/or rate of service requests that they direct to the system. Other types of request throttling may be employed in other embodiments.

In some embodiments, after aggressively throttling service requests in an attempt to exit the overloaded state, the system may be configured to determine whether the system is still in an overloaded state. For example, in some embodiments, the system may be configured to sample the performance of the system with respect to servicing client requests, or to periodically poll the system to determine if it is still in an overloaded state. For example, in some embodiments, only the requests that have been received within a most recent time window are considered when evaluating the overload state of the system. In response to determining that the system is in a non-overloaded state, as in 640, the method may include the system adjusting one or more throttle parameters until an ideal request rate is reached as in 650. For example, the system may be configured to decrease a throttle multiplier, and to do so in a way that avoids oscillating between overloaded and non-overloaded states (as described in more detail below). Again, in some embodiments, only the requests that have been received within a most recent time window are considered when evaluating the performance of the system, while in other embodiments, such an evaluation may be performed at fixed time intervals, but each evaluation instance may consider requests that were received within multiple time windows.

Figure 7:
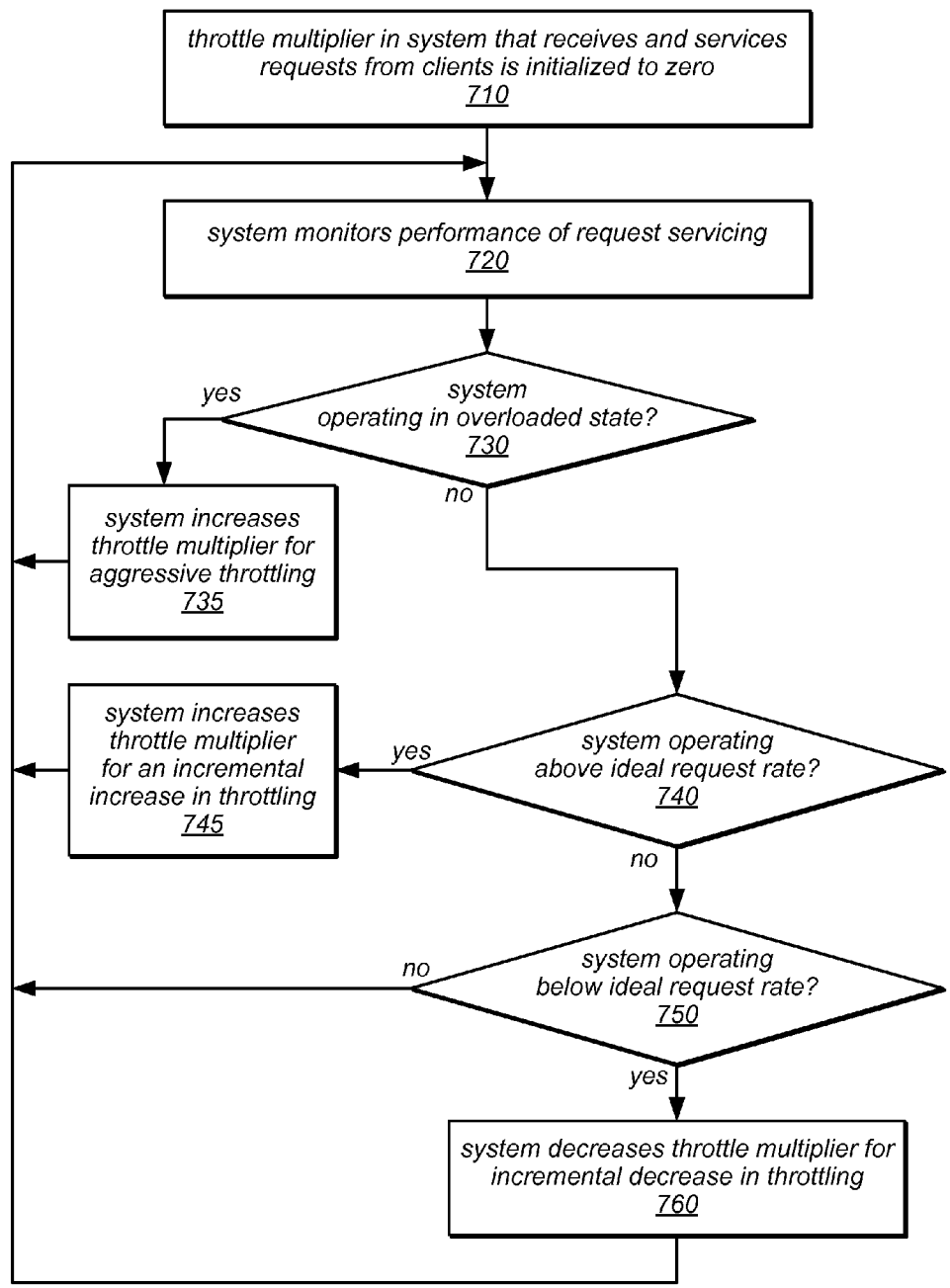
FIG. 7 is a flow diagram illustrating a method for reaching and maintaining an ideal request rate for servicing client requests, according to one embodiment.

One embodiment of a method for reaching and maintaining an ideal request rate for servicing client requests is illustrated by the flow diagram in FIG. 7. As illustrated in this example, the method may include a computing system that provides various services to clients (i.e. that receives and services client requests) initializing a throttle multiplier to zero, as in 710. In this example, setting the throttle multiplier to zero may result in all incoming service requests being accepted and serviced (i.e. none of the incoming requests being throttled) until or unless the throttle multiplier is subsequently changed or the system fails.

In this example, the system may be configured to monitor the performance of request servicing (e.g., to determine the performance of the system in servicing all, or a sample of, the client requests received, accepted, and/or serviced in a moving time window using any suitable performance criteria, including those described herein), as in 720. In other embodiments, such an evaluation may be performed at fixed time intervals, but each evaluation instance may consider requests that were received within multiple time windows. Note that the length of the window may be a default length for the system and/or it may be configurable at initialization and/or during operation. If the system is determined to be in an overloaded state, shown as the positive exit from 730, the method may include the system increasing the throttle multiplier by a pre-determined amount (e.g., a large amount selected in an attempt to aggressively throttle service requests and exit the overloaded state), as in 735. For example, in different embodiments, the system may employ any of various methods and/or criteria for determining that it is an overloaded state, including comparing a request rate or quality of service measurement with a fixed target, or using one or more of the techniques described herein for determining that the system is operating in an overloaded state dependent on client-specified or client-specific expectations of QoS.

Figure 8:
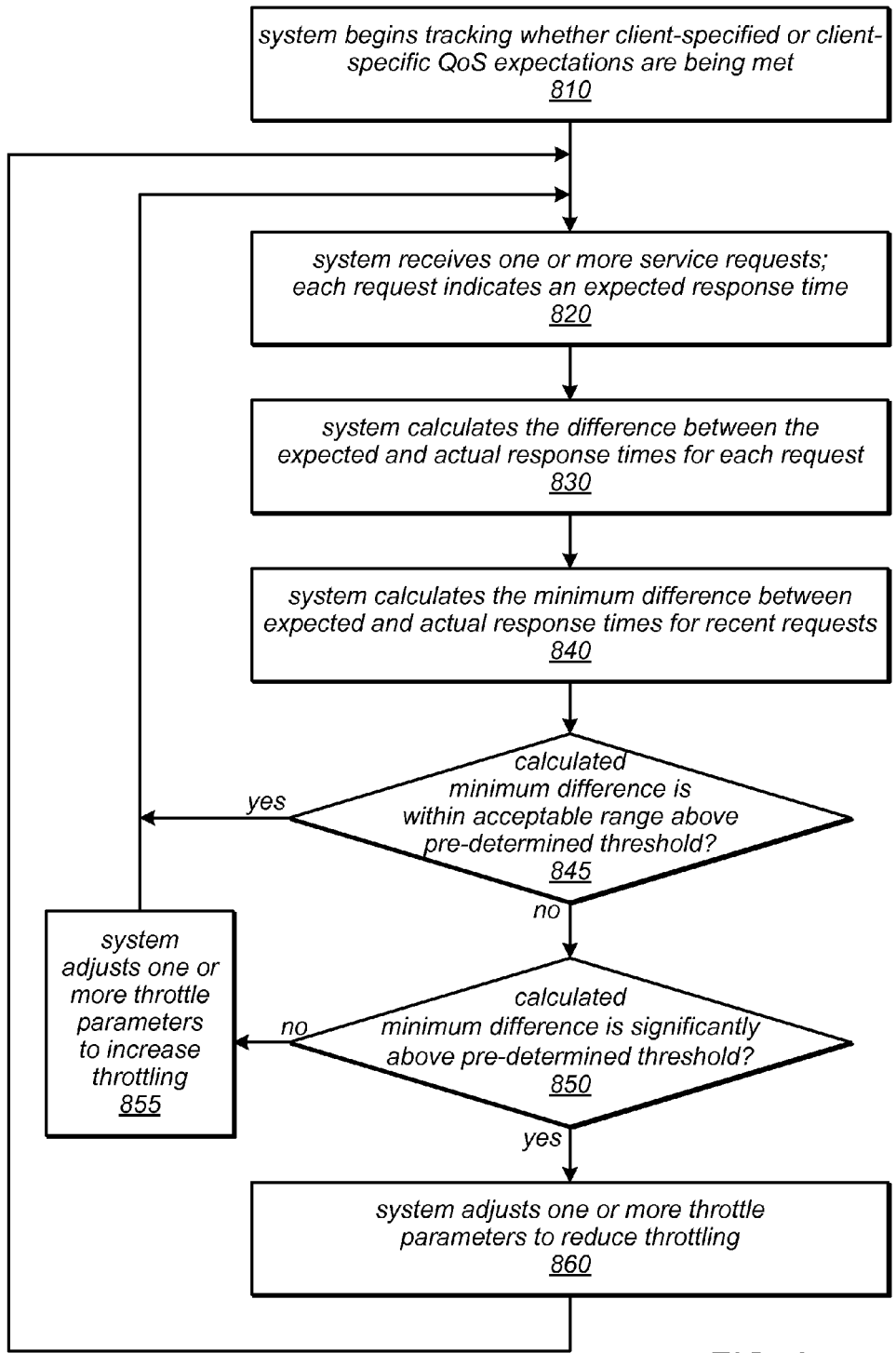
FIG. 8 is a flow diagram illustrating a method for reaching and maintaining an ideal request rate for service requests using a client-specified or client-specific expectation of quality of service, according to one embodiment.

As illustrated in this example, if the system is determined to be in a non-overloaded state, shown as the negative exit from 730, and the system is operating at a rate that is above the ideal request rate (meaning, for example, that the system is accepting and servicing client requests at a rate that is higher than an absolute ideal request rate or the request rates defined in an ideal request rate range, but not at a request rate high enough to cause the system to enter an overloaded state), as shown by the positive exit from 740, the method may include the system increasing the throttle multiplier in an attempt to incrementally increase throttling and, thus, to reduce the rate at which requests are accepted and/or serviced, as in 745. For example, the throttle multiplier may be increased by a less aggressive, incremental amount than the initial amount by which it was increased in an aggressive attempt to exit the overloaded state, in some embodiments. One embodiment of a method for determining whether the system is operating at an ideal request rate is illustrated in FIG. 8 and described in detail below. After increasing the throttle multiplier (as in 735 or 745), the method may include continuing to monitor service requests and response thereto as long as the system continues to operate. This is illustrated in FIG. 7 as the feedback from 735 to 720, and the feedback from 745 to 720. While the system continues to operate, any or all of the operations illustrated in FIG. 7 as 730 to 760 may be repeated, as applicable.

If the system is determined to be in a non-overloaded state, shown as the negative exit from 730, and the system is operating and the system is operating at a rate that is below the ideal request rate (meaning, for example, that the system is accepting and servicing client requests at a rate that is lower than an absolute ideal request rate or the request rates defined in an ideal request rate range), shown as the positive exit from 750, the method may include decreasing the throttle multiplier in an attempt to incrementally decrease throttling and, thus, to increase the rate at which requests are accepted and/or serviced, as in 760. For example, the throttle multiplier may be decreased by an incremental amount (e.g. by an amount that is less than the current throttle multiplier value) in an attempt to reach an ideal request rate. Otherwise, shown as the negative exits from 730, 740, and 750, the system may be operating at an ideal request rate. In this case, the system may not adjust the throttle multiplier at this point (i.e. based on the most recently collected or calculated performance data), but may continue monitoring system performance and adjusting the throttle multiplier in an attempt to maintain the ideal request rate. This is shown in FIG. 7 as the feedback from the negative exit of 750 to 720.

Note that, as in previous examples, in some embodiments, after increasing the throttle multiplier to aggressively throttle service requests and then determining that the system is no longer in an overloaded state, the system may not begin to back off of its aggressive throttling until the system has been in non-overloaded state for a given time period (e.g., for a given number of samples, or time periods over which the overloaded state is determined, according to various embodiments).

As illustrated in FIG. 7, the system may adjust the throttle multiplier in an attempt to reach and then maintain an ideal request rate by repeating any or all of the operations illustrated as 720-760 (as applicable) while the system is operating. For example, any or all of these operations may be repeated one or more times for groups of requests serviced in one or more subsequent time windows as long as the system is operating correctly. Again, in some embodiments, only the requests that have been received within a single time window are considered when evaluating the performance of the system, while in other embodiments, such an evaluation may be performed at fixed time intervals, but each evaluation instance may consider requests that were received within multiple time windows. Note that by slowly and/or incrementally increasing or reducing the amount of throttling in the system in an attempt to reach and maintain an ideal request rate, overloaded state oscillations may be avoided or their frequency reduced.

Note that in some embodiments, the throttle multiplier may be initialized to a value other than zero (e.g., to a default or client-specified value that is deemed likely to result in acceptable performance based on historical workloads and/or performance measurements). In such embodiments, if the system enters an overloaded state, it may employ the adaptive throttling techniques described herein (e.g., aggressively increasing the value of the throttle multiplier until the system exits the overloaded state, and then gradually reducing it) until the system reaches an ideal request rate.

One embodiment of a method for reaching and maintaining an ideal request rate for service requests using a client-specified or client-specific expectation of QoS is illustrated by the flow diagram in FIG. 8. As illustrated at 810 in this example, the method may include a computing system that provides various services to clients (i.e. that receives and services client requests) beginning to track whether (and/or how often) client-specified (or client-specific) QoS expectations are (or are not) being met. In various embodiments, these QoS expectations may be request-specific (e.g., an indication of a QoS expectation may be included in each service request), client- or client-specific, and/or specific to particular types of service requests. In some embodiments, an indication of a QoS expectation included in a service request may override a system-wide default QoS expectation or a default QoS expectation for a customer, client, and/or service request type. In this example, the QoS expectations tracked and evaluated for compliance by the system may include the maximum expected response time for service requests (e.g., the maximum time that a client is willing to wait for a response to a submitted service request). In other embodiments, other QoS expectations may be tracked and evaluated instead of, or in addition to, expected response time.

As illustrated in FIG. 8, the method may include the system receiving (e.g., from a client) one or more service requests, as in 820. In this example, each request may include an indication of the expected response time. In some embodiments, each request may also include an indication of a priority rank. In other embodiments, various QoS expectations that are customer- or client-specific, and/or specific to particular types of service requests may be stored in the system and accessed when requests are received in order to evaluate whether they are being met. As illustrated at 830 in FIG. 8, the method may include calculating the difference between the expected and actual response times for each request. The system may also calculate the minimum difference between the expected and actual response times for a group of recent requests, as in 840. For example, the system may be configured to calculate the minimum difference between the expected and actual response times for a group of requests that were recently received and/or serviced within a moving window of a time having a pre-determined length. Note that, as in other examples, the length of the window may be a default length for the system and/or it may be configurable at initialization and/or during operation. Within each such time period, all received requests may be considered, or a sampling of requests may be considered, in different embodiments. Note also that in other embodiments, such a calculation may be performed at fixed time intervals, but each evaluation instance may consider requests that were received within multiple time intervals.

In this example, if the calculated minimum difference between the expected and actual response times for the group of requests is within an acceptable range above a pre-determined ideal request rate threshold, shown as the positive exit from 845, the system may be operating at an ideal request rate. In other words, the positive exit from 845 may indicate a situation in which the rate at which requests are being accepted and serviced is slightly lower than the request rate defined by the ideal request rate threshold, but is within an acceptable ideal request rate range. In this example, the ideal request rate range may be defined as a range of request rates whose upper bound is the maximum rate at which incoming service requests can be accepted and serviced such that client-specified quality of service expectations are met for all (or a targeted percentage) of incoming service requests, as defined by the threshold for the calculated minimum difference between expected and actual response times. In some embodiments, defining an ideal request rate range as having such an upper bound may provide an acceptable and/or relatively conservative buffer between the ideal request rate range and higher request rates that could potentially cause the system to become overloaded. In other embodiments, e.g., in a less conservative implementation, the ideal request rate range may be defined as a pre-determined and/or relatively narrow range of request rates that is centered about the maximum rate at which incoming service requests can be accepted and serviced such that client-specified quality of service expectations are met for all (or a targeted percentage) of incoming service requests, or pre-determined and/or relatively narrow range of request rates whose lower bound is such an absolute ideal request rate. As illustrated in FIG. 8, if the system is operating at an ideal request rate, no adjustments to the throttle parameters may be made (at this point). In this example, if the calculated minimum difference between the expected and actual response times for the group of requests is significantly above a pre-determined threshold, shown as the positive exit from 850, the system may be operating at a request rate that is lower than an absolute ideal request rate or the request rates defined in an ideal request rate range, and may be able to service requests at a higher rate, while still meeting QoS expectations for a targeted percentage of income requests (e.g., for all requests or for a pre-determined high percentage of requests). In this case, the method may include the system adjusting one or more throttle parameters to reduce throttling, as in 860. For example, the system may decrease a throttle multiplier by an incremental amount (e.g. by an amount that is less than the current throttle multiplier value), which may result in a higher percentage of requests being accepted and/or serviced.

If the calculated minimum difference between the expected and actual response times for the group of requests is not above a pre-determined threshold, shown as the negative exit from 850, it must be below the pre-determined threshold, i.e. the system must be operating at a request rate that is higher than an absolute ideal request rate or the request rates defined in an ideal request rate range. In this case, the method may include the system adjusting one or more throttle parameters to increase throttling, as in 855. For example, the system may increase a throttle multiplier by an incremental amount (e.g. by an amount that is less than the current throttle multiplier value), which may result in a smaller percentage of requests being accepted and/or serviced. Note that, as in other examples, the threshold value may be a default value for the system and/or it may be configurable at initialization and/or during operation. Note also that in this and other embodiments, the incremental amount by which a throttle multiplier is increased (e.g., in 855 or 745) and the incremental amount by which the throttle multiplier is decreased (e.g., in 860 or 760) may have the same value or may have different values. In some embodiments, theses values may be default values for the system and/or may be configurable at initialization and/or during operation.

After adjusting one or more throttle parameters, or if no adjustments are necessary because the system is operating at an ideal request rate, the method may include continuing to monitor service requests and response thereto, and to adjust one or more throttle parameters (when necessary) to attempt to reach and/or maintain an ideal request rate, as long as the system continues to operate. This is illustrated in FIG. 8 by the feedback paths from the positive exit of 845 to 820, from 855 to 820, and from 860 to 820. While the system continues to operate, any or all of the operations illustrated in FIG. 8 as 820 to 860 may be repeated, as applicable. For example, any or all of these operations may be repeated one or more times for groups of requests serviced in one or more subsequent time windows as long as the system is operating correctly.

In general, techniques that leverage the concept of an ideal request rate may be employed in a wide variety of systems that receive, accept, and/or service requests on behalf of clients to achieve the maximum throughput possible while still meeting QoS expectations for all (or a targeted high percentage) of incoming requests. Note that while several of the examples herein describe iteratively adjusting throttling to reach (and then maintain) an ideal request rate following an exit from an overloaded state, in other embodiments, these techniques may be employed in an attempt to avoid overload conditions entirely by only accepting the requests that can be serviced successfully.

As described herein, systems that provide services to clients (e.g., systems that receive, accept, and/or service requests on behalf of clients) may employ a variety of approaches to determine whether they are operating in an overloaded state. As previously noted, typical systems avoid an overload scenario by comparing the request rate and/or the quality of service perceived by the system itself with a fixed or varying global threshold and selectively refusing service to clients once this threshold has been crossed.

By contrast, the systems described herein may in some embodiments use the client's perception of the performance of the system to determine whether the system is overloaded. For example, in some embodiments, clients may explicitly specify an expectation of quality of service (e.g., a maximum response time) with every request they send to the system. In other embodiments, various QoS expectations that are customer- or client-specific, and/or specific to particular types of service requests may be stored in the system and accessed when requests are received in order to evaluate whether they are being met. In some embodiments, beginning at initialization (e.g., at bootstrap), the system may be configured to satisfy every request it receives, while keeping track of the number of requests (in a fixed time interval) that it was not able to satisfy with the expected quality of service. As long as the system is able to satisfy all (or a high percentage) of requests with their respective client-specified expected quality of service, it may continue to service every request it receives, irrespective of its performance characteristics. However, if the system fails to satisfy a pre-determined percentage of client requests with their respective client-specified expected quality of service (e.g., from among requests received within a fixed time interval), the system may be considered to be in an overload mode.

In some embodiments, when a system is operating in an overload mode, the system may begin dropping or throttling client requests at a rate proportional to their priority rank and/or a throttle multiplier, as described above. As previously noted, in some embodiments, high priority requests may have a low priority rank. Therefore, the system may throttle high priority requests at a rate that is lower that a rate at which low priority requests are throttled. The system may continue to keep track of the quality of service achieved when servicing the requests it chooses to accept, and may compare it with client-specified QoS expectations associated with those requests. In various embodiments, and based on the severity of the overload scenario, the system may adjust its throttle multiplier in an attempt to exit an overloaded state, e.g., using any of the techniques described herein.

Figure 9:
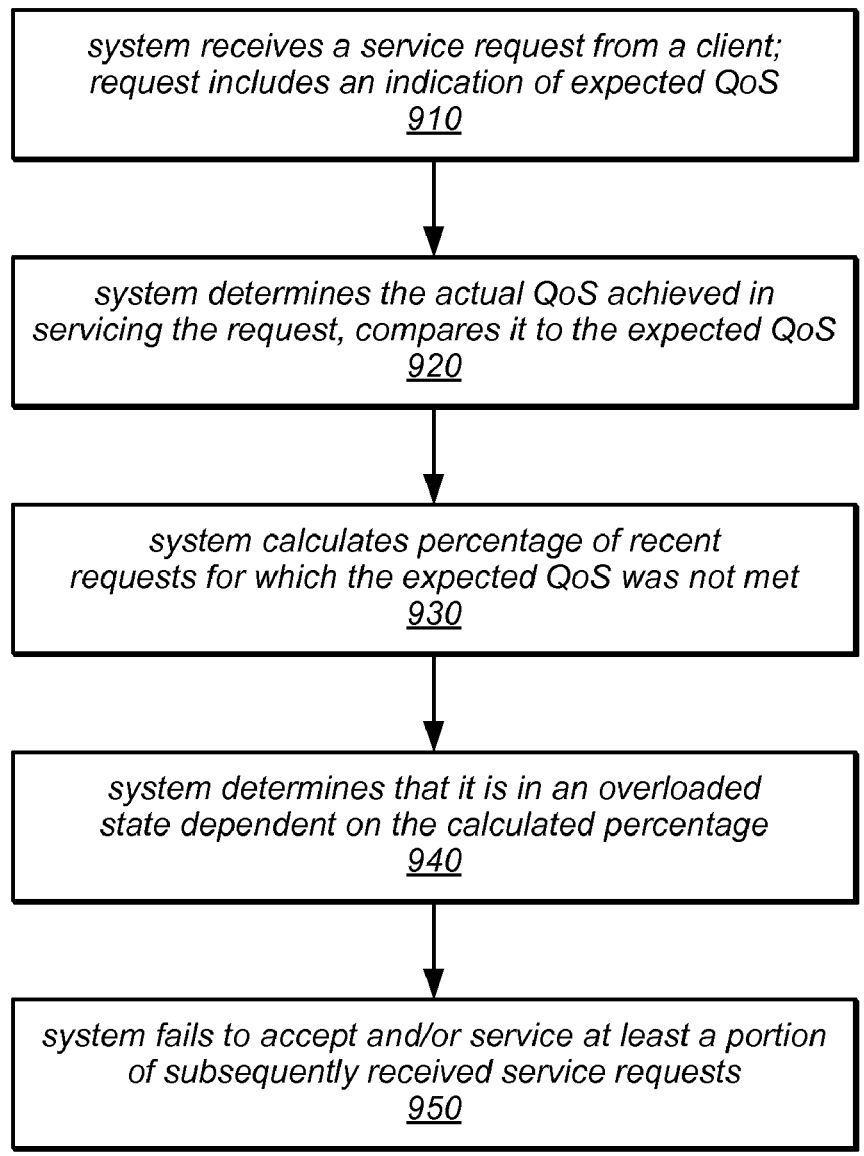
FIG. 9 is a flow diagram illustrating a method for determining whether a computing system that provides various services to clients is operating in an overloaded state, according to one embodiment.

One embodiment of a method for determining whether a computing system that provides various services to clients (i.e. that receives and services client requests) is operating in an overloaded state is illustrated by the flow diagram in FIG. 9. As illustrated in this example, the method may include the system receiving a service request from a client that includes an indication of expected QoS. In various embodiments, the QoS expectation may be request-specific (e.g., a QoS expectation may be explicitly included in each service request), customer- or client-specific, and/or specific to particular types of service requests. In some embodiments, an indicator that is usable to determine a QoS expectation for the service request may be included in the request. For example, in some embodiments, various QoS expectations that are customer- or client-specific, and/or specific to particular types of service requests may be stored in the system and accessed when requests are received in order to evaluate whether they are being met. In some such embodiments, a customer may be able to specify the values of one or more of the configurable parameters described herein (e.g., a time window length, an ideal request rate threshold, an overload indicator, or various throttle parameters) as default values to be applied when servicing requests submitted on their behalf (e.g., when they register as a subscriber to the service). In some embodiments, the stored information may include two or more values for a given configurable parameter (e.g., for use with different request types, requests having different priority ranks, etc.). In embodiments in which such parameter values are store, each service request may include an indication of the customer, client, and/or type service request, which may be used to determine the stored QoS expectations that are applicable to the request. In some embodiments, a QoS expectation (or indication thereof) that is included in a service request may override a system-wide default QoS expectation or a default QoS expectation for a customer, client, and/or service request type. In some embodiments, each request may include an indication of a priority rank.

As illustrated in FIG. 9, the method may include the system determining the actual QoS achieved in servicing the request, as in 920, and comparing the actual QoS to the expected QoS. In some embodiments, the system may calculate the percentage of recent requests for which the expected QoS was not met, as in 930. For example, the system may be configured to calculate the percentage of requests for which QoS expectations were not met for a group of requests received within a moving window of a time having a pre-determined length. Note that, as in other examples, the length of the window may be a default length for the system and/or it may be configurable at initialization and/or during operation. Within such a time period, all received requests may be considered, or a sampling of requests may be considered, in different embodiments. As described above, the method may include the system determining whether it is in an overloaded state dependent on the calculated percentage of requests for which QoS expectations were not met for this group of requests. For example, if the calculated percentage of requests for which QoS expectations were not met is higher than a pre-determined overload indicator value, the system may be considered to be in an overloaded state. Note that in various embodiments, this overload indicator value may be request-specific, customer- or client-specific, and/or specific to particular types of service requests. In some embodiments, it may be a default value for the system and/or it may be configurable at initialization and/or during operation.

In some embodiments, in response to determining that the system is in an overloaded state, as in 940, the system may reject (i.e. may deliberately fail to accept or acknowledge) at least a portion of the service requests that are subsequently directed to the system, or may deliberately fail to service at least a portion of the service requests that are received by the system, as in 950. For example, in some embodiments, in response to determining that the system is in an overloaded state, the system may throttle at least a portion of at least a portion of the service requests that are subsequently directed to the system using any suitable technique for throttling requests, including, but not limited to, those described herein. In some embodiments, throttling may include sending an indication to one or more clients that the system is in an overloaded state and/or that they should reduce the number and/or rate of service requests that they direct to the system. The percentage of requests that are throttled, accepted, and/or serviced may in some embodiments be dependent on the calculated percentage of requests for which QoS expectations were not met during a recent time period. As previously noted, in some embodiments, the system may drop or throttle client requests at a rate that is proportional to their priority rank and a throttle multiplier.

In some embodiments, the systems described herein may request characteristics (e.g., expected QOS and priority rank) provided by clients (as defaults or with each service request) to determine the overload state of the system (e.g., to determine whether the system is in an overloaded state or a non-overloaded state), and to help in victim selection during an overloaded state. Therefore, unlike in typical systems in which "system overload" status is based on global performance thresholds, in such embodiments the overload state of the system may be determined based on the performance of the system as perceived by its clients.

Figure 10:
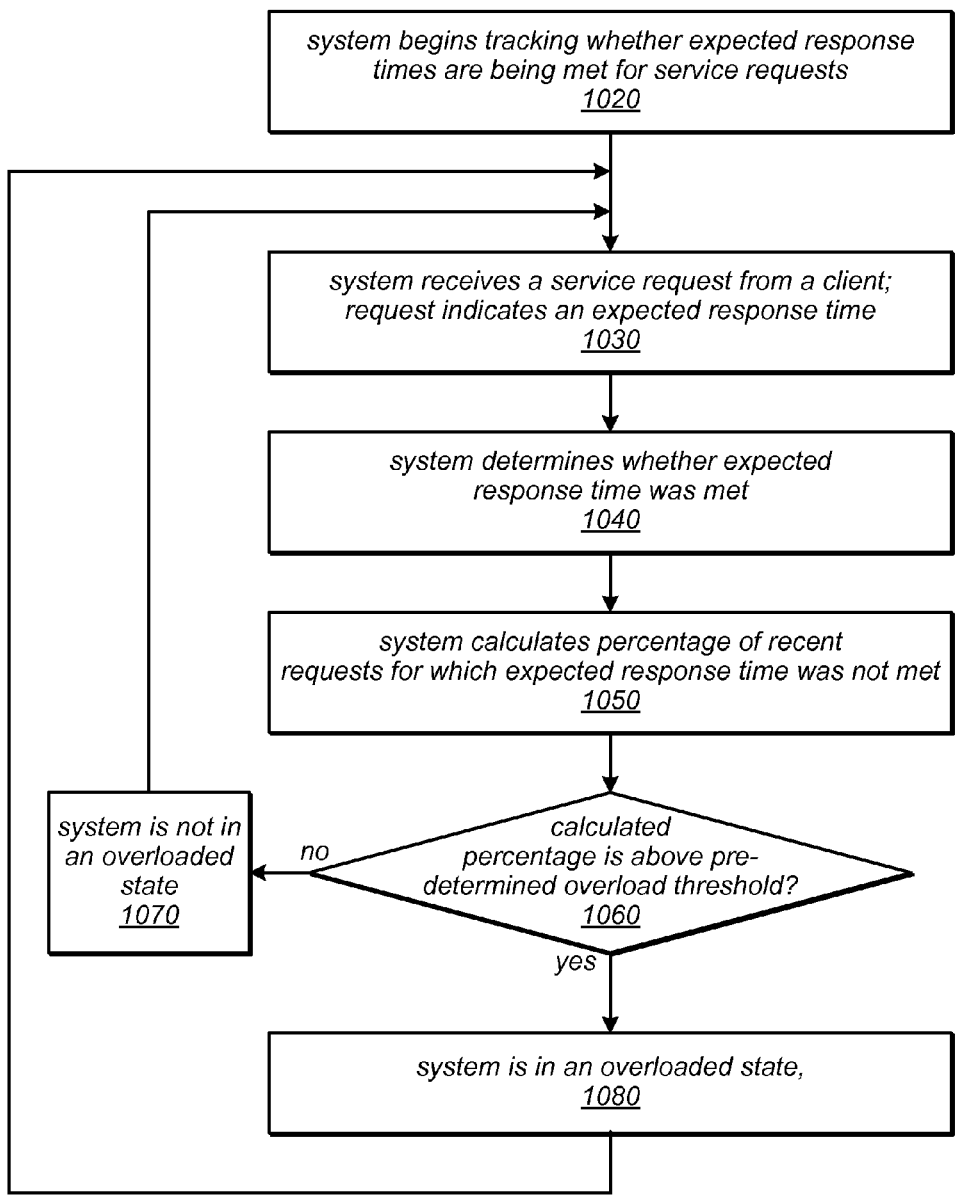
FIG. 10 is a flow diagram illustrating a method for determining whether a computing system that provides various services to clients is operating in an overloaded state based on an expected response time, according to one embodiment.

One embodiment of a method for determining whether a computing system that provides various services to clients (i.e. that receives and services client requests) is operating in an overloaded state based on an expected response time is illustrated by the flow diagram in FIG. 10. As illustrated at 1020 in this example, the method may include the system beginning to track whether expected response times are (or are not) being met for service requests. The method may include the system receiving a service request from a client that includes an indication of an expected response time (e.g., the maximum time that a client is willing to wait for a response), as in 1030. In various embodiments, the expected response time may be request-specific (e.g., an expected response time may be explicitly included in each service request), customer- or client-specific, and/or specific to particular types of service requests. In some embodiments, an indicator that is usable to determine an expected response time for the service request may be included in the request. For example, in some embodiments, various QoS expectations that are customer- or client-specific, and/or specific to particular types of service requests (including expected response times) may be stored in the system and accessed when requests are received in order to evaluate whether they are being met. In such embodiments, the request may include an indication of the customer, client, and/or type service request, which may be used to determine the stored expected response time that is applicable to the request. In some embodiments, an expected response time (or indication thereof) that is included in a service request may override a system-wide default for the expected response time or a default response time expectation for a customer, client, and/or service request type. In some embodiments, each request may include an indication of a priority rank in addition to an expected response time.

As illustrated in FIG. 10, the method may include the system determining whether the expected response time was met, as in 1040. In some embodiments, the system may calculate the percentage of recent requests for which the expected response time was not met, as in 1050. For example, the system may be configured to calculate the percentage of requests for which expected response times were not met for a group of requests received within a moving window of a time having a pre-determined length. Note that, as in other examples, the length of the window may be a default length for the system and/or it may be configurable at initialization and/or during operation. Within such a time period, all received requests may be considered, or a sampling of requests may be considered, in different embodiments.

As described above, the method may include the system determining whether it is in an overloaded state dependent on the calculated percentage of requests for which expected response times were not met for this group of requests. For example, if the calculated percentage of requests for which expected response times were not met is higher than a pre-determined overload threshold, i.e. an overload indicator value, the system may be considered to be in an overloaded state. This is illustrated in FIG. 10 as the positive exit from 1060 and element 1080. On the other hand, if the calculated percentage of requests for which expected response times were not met is not higher than the pre-determined overload threshold (or overload indicator value), shown as the negative exit from 1060, the system may be considered to be in a non-overloaded state, as in 1070. Note that in various embodiments, the overload indicator value may be request-specific, customer- or client-specific, and/or specific to particular types of service requests. In some embodiments, it may be a default value for the system and/or it may be configurable at initialization and/or during operation. As illustrated by the feedback paths from 1070 to 1030 and from 1080 to 1030 in FIG. 10, the system may be configured to continue to track whether expected response times are (or are not) being met, and to determine whether (and when) the system is in an overloaded state, as long as the system continues to operate.

In some embodiments, the system may be configured to drop and/or throttle at least a portion of the service requests that are subsequently directed to the system while the system is in an overloaded state (e.g., in an attempt to exit the overloaded state), and to accept and service all service requests while in a non-overloaded state. In other embodiments, the system may be configured to adaptively throttle service requests in order to exit an overloaded state, to avoid oscillating between overloaded and non-overloaded states, and/or to reach or maintain an ideal request rate, as described herein.

Figure 11:
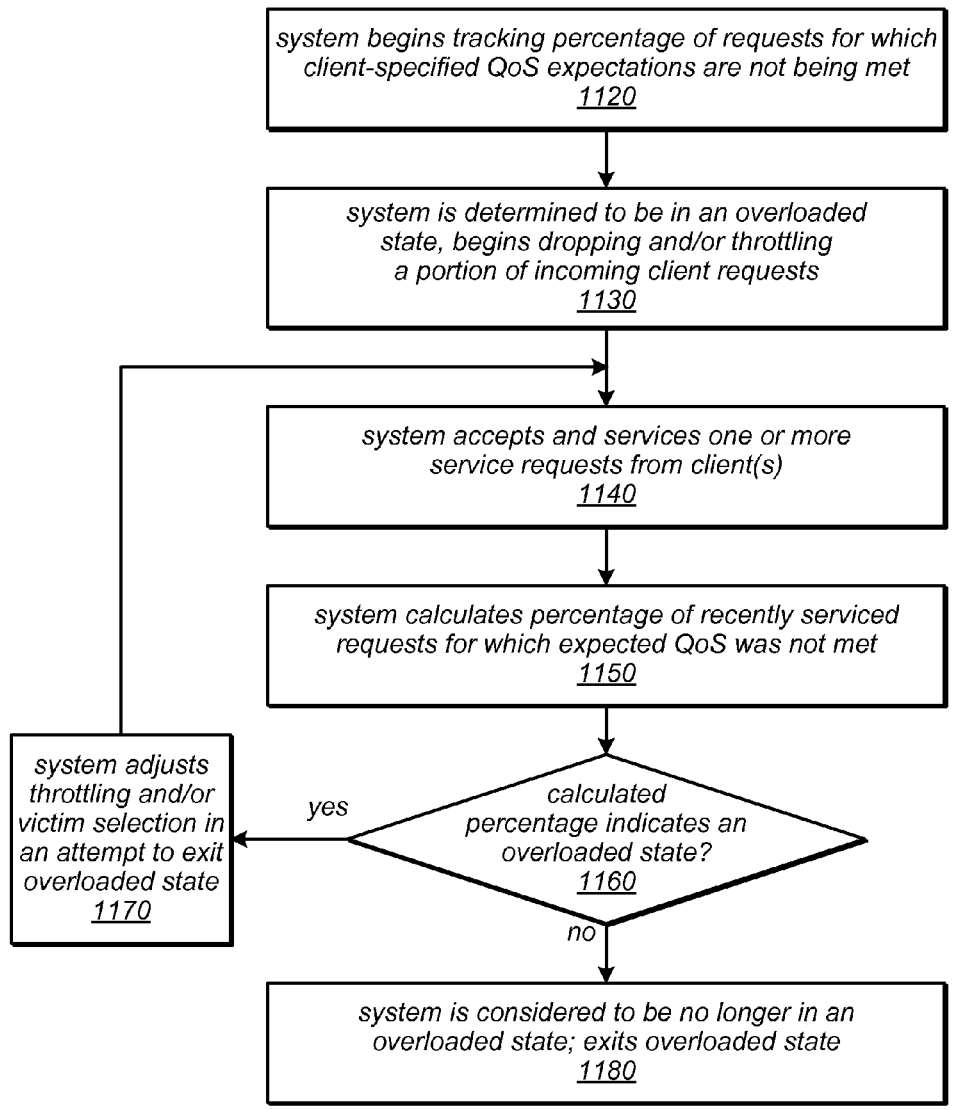
FIG. 11 is a flow diagram illustrating a method for determining whether computing system that provides various services to clients is operating in an overloaded state and attempting to exit the overloaded state, according to one embodiment.

One embodiment of a method for determining whether a computing system that provides various services to clients (i.e. that receives and services client requests) is operating in an overloaded state and attempting to exit the overloaded state is illustrated by the flow diagram in FIG. 11. As illustrated at 1120 in this example, the method may include the system beginning to track the percentage of service requests for which one or more client-specified or client-specific QoS expectations are not being met. The method may include the system determining that it is an overloaded state, and beginning to drop and/or throttle at least a portion of incoming client requests, as in 1130. In some embodiments, in response to determining that the system is in an overloaded state, the system may be configured to adaptively throttle service requests in an attempt to exit an overloaded state, to avoid oscillating between overloaded and non-overloaded states, and/or to reach or maintain an ideal request rate, as described herein. In some embodiments, the number or percentage of requests that are dropped or throttled may be dependent on the percentage of requests for which client-specified or client-specific QoS expectations are (or are not) being met and/or on a throttle multiplier, as described herein. The victims of this exercise (i.e. the specific requests that are dropped or throttled) may in some embodiments be selected dependent on a priority rank. For example, the system may drop or throttle high priority requests at a lower rate than the rate at which low priority requests are dropped or throttled.

As illustrated in this example, the method may include the system accepting and servicing one or more service request (e.g., from one or more clients), as in 1140. As in previous examples, these requests may include one or more QoS expectations, and/or the system may determine applicable QoS expectations dependent on information included in the requests, as described herein. Although not all requests directed to the system while in an overloaded state are accepted and/or serviced, the system may continue to calculate the percentage of recently serviced requests for which QoS expectations are (or are not) met, as in 1150. For example, the system may be configured to calculate the percentage of requests for which QoS expectations were not met for a group of requests received within a moving window of a time having a pre-determined length. Note that, as in other examples, the length of the window may be a default length for the system and/or it may be configurable at initialization and/or during operation. Within such a time period, all received requests may be considered, or a sampling of requests may be considered, in different embodiments.

As described above, the method may include the system determining whether it is in an overloaded state dependent on the calculated percentage of requests for which QoS expectations were not met for this group of requests. For example, if the calculated percentage of requests for which QoS expectations were not met is higher than a pre-determined overload threshold, i.e. an overload indicator value, the system may be considered to be in an overloaded state. Note that in various embodiments, the overload indicator value may be request-specific, customer- or client-specific, and/or specific to particular types of service requests. In some embodiments, it may be a default value for the system and/or it may be configurable at initialization and/or during operation. In some embodiments, if the calculated percentage of recently serviced requests for which QoS expectations were not met indicates that the system is in an overloaded state, shown as the positive exit from 1160, the method may include the system adjusting one or more throttle parameters and/or performing a victim selection for dropping or throttling incoming requests in an attempt to exit the overloaded state, as in 1170.

As illustrated in this example, in some embodiments, the operations illustrated as 1140-1170 in FIG. 11 may be repeated one or more times (e.g., for requests serviced in one or more subsequent time windows) until the calculated percentage of recently serviced requests for which QoS expectations were not met no longer indicates that the system is in an overloaded state. This is shown in FIG. 11 as the feedback path from 1170 to 1140. Once the calculated percentage does not indicate that the system is in an overloaded state, shown as the negative exit from 1160, the system may be considered to be no longer in an overloaded state. In this case, the method may include the system exiting the overloaded state, as in 1180. In various embodiments, exiting the overloaded state may include reducing or eliminating the dropping or throttling of incoming service requests. For example, in some embodiments, in response to exiting the overloaded state, the system may be configured to accept and service all incoming service requests until or unless another overload condition is detected. In other embodiments, in response to exiting the overloaded state, the system may be configured to adaptively throttle service requests in order to exit an overloaded state, to avoid oscillating between overloaded and non-overloaded states, and/or to reach or maintain an ideal request rate, as described herein.

Note that each of the techniques described herein may be employed independently and/or in various combinations, in different embodiments. For example, systems that provide services to clients and that receive, accept, and/or service requests on behalf of those clients may implement any or all of the techniques described herein for determining the overload state of a system, dropping or throttling requests, damping oscillations between an overloaded state and a non-overloaded state, and/or reaching and maintaining an ideal request rate, in any combinations.

Figure 12:
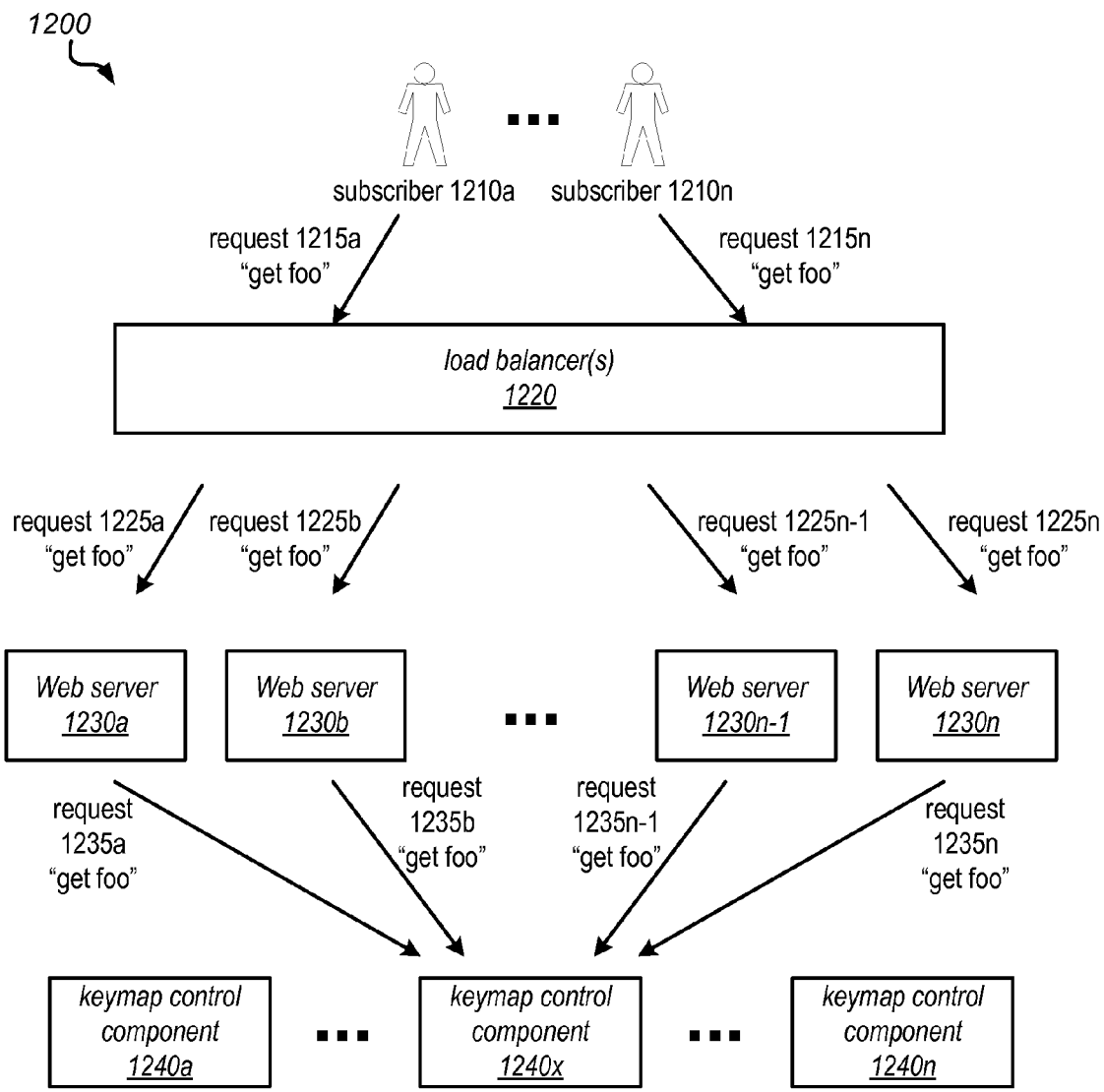
FIG. 12 is a block diagram illustrating a portion of a distributed storage system to which the techniques described herein may be applied, according to one embodiment.

The techniques described herein for determining the overload state of a system (e.g., to determine whether the system is operating in an overloaded state or a non-overloaded state), damping oscillations between an overloaded state and a non-overloaded state and/or reaching and maintaining an ideal request rate may be applied in a wide variety of systems that provide various services to clients (i.e. that receive and service client requests). For example, any or all of these techniques may be applied in a distributed storage system that provides access to a subscriber's data through one or more Web servers. FIG. 12 is a block diagram illustrating a portion of such a distributed storage system, according to one embodiment. In this example, a distributed storage system 1200 may include one or more load balancers 1220, a plurality of Web servers 1230 (illustrated in FIG. 12 as 1230a-1230n), and a plurality keymap control components 1240 (illustrated in FIG. 12 as 1240a-1240n).

In this example, load balancer(s) 1220 may be configured to distribute each incoming request from subscribers 1210 (e.g., subscribers 1210a-1210n) for access to subscriber data to one of the plurality of Web servers 1230, using any suitable load balancing technique and/or distribution criteria. Web servers 1230 may be configured to receive requests for access to data stored in the storage system (e.g., requests to put, get, or modify data) from load balancer(s) 1220 on behalf of subscribers 1210. In this example, keymap control components 1240 may be configured to map requests to access data to a respective node in the distributed system on which the data is stored (e.g., dependent on a user key associated with the data and included in the request).

In response to receiving a request from a subscriber 1210, load balancer(s) 1220 may route the request to a particular Web server 1230, which may be configured to determine a particular one of the keymap control components 1240 to which the request should be directed (e.g., because the particular keymap control component 1240 stores, or otherwise has access to, a mapping between the data targeted by the request and a storage node on which it can be accessed).

As illustrated in FIG. 12, if multiple requests 1215 (shown as requests 1215a-1215n) are received from one or more subscribers 1210 to access data having the same key (e.g., if multiple "get" requests are received that target data associated with the key "foo"), these requests may initially be distributed (e.g., by load balancer(s) 1220) to multiple Web servers 1230 as requests 1225a-1225n. However, each of the Web servers 1230 to which these requests are initially distributed may subsequently route them to the same keymap control component 1240 (e.g., keymap control component 1240x, in this example), if that keymap control component 1240 stores, or otherwise has access to, a mapping between the data targeted by the request (i.e. data associated with the key "foo") and a storage node on which it can be accessed (not shown). If the number of such requests is large enough and/or the rate at which they are received by the system is high enough, the system may enter an overloaded state, as described herein.

In the system illustrated in FIG. 12, the techniques described herein may be employed to determine the overload state of a system based on client-specific QoS expectations (such as expected response times), to drop or throttle requests when the system is operating in an overloaded state, to damp oscillations between an overloaded state and a non-overloaded state (e.g., through adaptive throttling), and/or to reach and maintain an ideal request rate in order to better serve subscribers 1210 while avoiding a system shutdown or failure caused by a crushing overload. In one specific example, if each individual keymap control component 1240 is capable of handling requests at a rate of 3000 transactions per second (Tps), but more than 3000 requests per second are directed to a single keymap control component 1240 (e.g., keymap control component 1240x), its performance (and thus the performance of the system) may degrade, and the level of degradation may be proportional to the amount by which the actual Tps rate exceeds the capacity of the keymap control component (i.e. the rate at which the requests exceed 3000 Tps). In this example, the techniques described herein may be employed in the system to determine the overload state of the system, to drop or throttle requests, to damp oscillations between an overloaded state and a non-overloaded state, and/or to reach and maintain an ideal request rate may prevent keymap control component 1240x from failing, due to its inability to handle a crushing load.

Note that the number of subscribers 1210, requests 1215 and 1225, Web servers 1230, and keymap control components 1240 illustrated in FIG. 12 (designated as "n" for each of these component types) may not be the same. In other words, the values of "n" for each of these component types may be independent of each other, in this example.

In some embodiments, the system and methods described herein for determining whether a system is operating in an overloaded state, dropping or throttling requests, damping oscillations between an overloaded state and a non-overloaded state, and/or reaching and maintaining an ideal request rate may be employed in a system through which various services are provided to subscribers as part of a virtualized computing service. In various embodiments, such virtualized computing may be offered as an on-demand, paid service to clients. For example, an enterprise may assemble and maintain the various hardware and software components used to implement virtualized computing, and may offer clients access to these resources according to various pricing models (e.g., usage-based pricing, subscription pricing, etc.). Thus, clients may have access to a range of virtual computing resources without having to incur the costs of provisioning and maintaining the infrastructure needed to implement those resources.

Example Computer System Embodiment

It is contemplated that in some embodiments, any of the methods, techniques or components described herein may be implemented as instructions and data capable of being stored or conveyed via a computer-accessible medium. Such methods or techniques may include, for example and without limitation, various methods for determining the overload state of a system, dropping or throttling requests, damping oscillations between an overloaded state and a non-overloaded state, and/or reaching and maintaining an ideal request rate, as described herein. Such instructions may be executed to perform specific computational functions tailored to specific purposes (e.g., processing requests received via a Web services interface, or returning feedback and/or results of servicing various requests) as well as higher-order functions such as operating system functionality, virtualization functionality, network communications functionality, application functionality, storage system functionality, and/or any other suitable functions.

Figure 13:
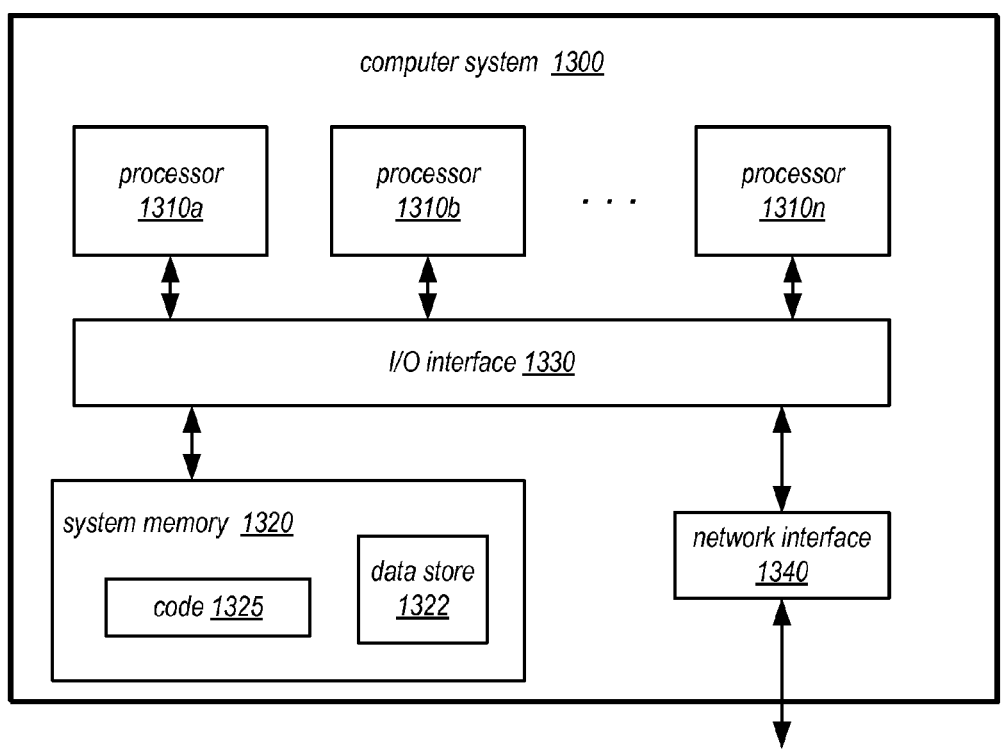
FIG. 13 illustrates one embodiment of a computer system that implements one or more of the techniques described herein.

One example embodiment of a computer system that includes computer-accessible media and that provides mechanisms for determining the overloaded state of a system, dropping or throttling requests, damping oscillations between an overloaded state and a non-overloaded state, and/or reaching and maintaining an ideal request rate is illustrated in FIG. 13. In various embodiments, the functionality of any of the various modules or methods described herein may be implemented by one or several instances of computer system 1300. In particular, it is noted that different elements of the system described herein may be implemented by different computer systems 1300. For example, a computer system that supports the functionality described herein for determining the overload state, dropping or throttling requests, damping oscillations between an overloaded state and a non-overloaded state, and/or reaching and maintaining an ideal request rate may be implemented on the same computer system 1300 on which a client (through which a customer/subscriber may access the system) executes, or on another computer system 1300, in different embodiments. In another example, different subsystems (e.g., a Web service interface, an admission control subsystem, and a service request subsystem; or one or more load balancers, Web servers, and/or keymap control components) may be implemented on or across multiple ones of the computing nodes, and each of the computing nodes may be similar to computer system 1300.

In the illustrated embodiment, computer system 1300 includes one or more processors 1310 coupled to a system memory 1320 via an input/output (I/O) interface 1330. Computer system 1300 further includes a network interface 1340 coupled to I/O interface 1330. In various embodiments, computer system 1300 may be a uniprocessor system including one processor 1310, or a multiprocessor system including several processors 1310 (e.g., two, four, eight, or another suitable number). Processors 1310 may be any suitable processor capable of executing instructions. For example, in various embodiments processors 1310 may be a general-purpose or embedded processor implementing any of a variety of instruction set architectures (ISAs), such as the x86, PowerPC™, SPARC™, or MIPS™ ISAs, or any other suitable ISA. In multiprocessor systems, each of processors 1310 may commonly, but not necessarily, implement the same ISA.

System memory 1320 may be configured to store instructions (e.g., code 1325) and data (e.g., in data store 1322) accessible by processor 1310. In various embodiments, system memory 1320 may be implemented using any suitable memory technology, such as static random access memory (SRAM), synchronous dynamic RAM (SDRAM), nonvolatile/Flash-type memory, or any other type of memory. In the illustrated embodiment, instructions and data implementing desired functions, methods or techniques (such as functionality for supporting determining an overload state, dropping or throttling requests, damping oscillations between an overloaded state and a non-overloaded state, and/or reaching and maintaining an ideal request rate according to various mechanisms described herein), are shown stored within system memory 1320 as code 1325. It is noted that in some embodiments, code 1325 may include instructions and data implementing desired functions that are not directly executable by processor 1310 but are represented or encoded in an abstract form that is translatable to instructions that are directly executable by processor 1310. For example, code 1325 may include instructions specified in an ISA that may be emulated by processor 1310, or by other code 1325 executable on processor 1310. Alternatively, code 1325 may include instructions, procedures or statements implemented in an abstract programming language that may be compiled or interpreted in the course of execution. As non-limiting examples, code 1325 may include code specified in a procedural or object-oriented programming language such as C or C++, a scripting language such as perl, a markup language such as HTML or XML, or any other suitable language.

In some embodiments, data store 1322 within system memory 1320 may store values of default, client-specific, or type-specific configurable parameters; actual QoS information; calculated percentages of requests for which QoS expectations were not met; calculated differences between expected and actual QoS, and/or other data in various data structures suitable for implementing the techniques described herein.

In one embodiment, I/O interface 1330 may be configured to coordinate I/O traffic between processor 1310, system memory 1320, and any peripheral devices in the device, including network interface 1340 or other peripheral interfaces. In some embodiments, I/O interface 1330 may perform any necessary protocol, timing or other data transformations to convert data signals from one component (e.g., system memory 1320) into a format suitable for use by another component (e.g., processor 1310). In some embodiments, I/O interface 1330 may include support for devices attached through various types of peripheral buses, such as a variant of the Peripheral Component Interconnect (PCI) bus standard or the Universal Serial Bus (USB) standard, for example. In some embodiments, the function of I/O interface 1330 may be split into two or more separate components, such as a north bridge and a south bridge, for example. Also, in some embodiments some or all of the functionality of I/O interface 1330, such as an interface to system memory 1320, may be incorporated directly into processor 1310.

Network interface 1340 may be configured to allow data to be exchanged between computer system 1300 and other devices attached to a network, such as other computer systems, for example. In various embodiments, network interface 1340 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

In some embodiments, system memory 1320 may include a non-transitory, computer-readable storage medium configured to store instructions and data as described above. However, in other embodiments, instructions and/or data may be received, sent or stored upon different types of computer-accessible storage media. Generally speaking, a computer-accessible storage medium may include storage media or memory media such as magnetic or optical media, e.g., disk or CD/DVD-ROM coupled to computer system 1300 via I/O interface 1330. A computer-accessible storage medium may also include any volatile or non-volatile storage media such as RAM (e.g. SDRAM, DDR SDRAM, RDRAM, SRAM, etc.), ROM, etc, that may be included in some embodiments of computer system 1300 as system memory 1320 or another type of memory. A computer-accessible storage medium may generally be accessible via transmission media or signals such as electrical, electromagnetic, or digital signals, conveyed via a communication medium such as a network and/or a wireless link, such as may be implemented via network interface 1340.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method, comprising:
    performing, by a computer system that provides services to clients:
        initializing the value of a throttle multiplier in the computer system to zero, wherein a throttle multiplier value of zero indicates that all incoming service requests should be serviced and no incoming service requests should be throttled;
        receiving a plurality of incoming service requests;
        detecting that the computer system is in an overloaded state with respect to the incoming service requests;
        in response to said detecting, increasing the value of the throttle multiplier by an amount that is large enough to cause the computer system to return to a non-overloaded state, wherein increasing the value of the throttle multiplier causes an increase in the percentage of incoming service requests that are throttled;
        in response to the computer system returning to a non-overloaded state, reducing the throttle multiplier value by an amount smaller than the amount by which it was increased, wherein reducing the value of the throttle multiplier causes a decrease in the percentage of incoming service requests that are throttled.

2. The method of claim 1, wherein said increasing comprises incrementing the throttle multiplier value two or more times until it reaches a value large enough to cause the computer system to return to a non-overloaded state.

3. The method of claim 1, further comprising:
    subsequent to said reducing, determining whether the computer system is still in a non-overloaded state; and
    in response to determining that the computer system is still in a non-overloaded state, further reducing the throttle multiplier value.

4. The method of claim 1, wherein said reducing is performed after the computer system has been in a non-overloaded state for a pre-determined time period following the return of the computer system to a non-overloaded state.

5. A system, comprising:
one or more processors; and
a memory coupled to the one or more processors and storing program instructions that when executed by the one or more processors cause the one or more processors to perform:
  detecting that the system is in an overloaded state, wherein the system receives and responds to service requests, and wherein said detecting comprises determining that the system is in an overloaded state with respect to incoming service requests;
  in response to said detecting, modifying one or more throttle parameters, wherein said modifying causes the system to increase throttling of incoming service requests by an amount large enough to return the system to a non-overloaded state; and
  in response to the system returning to a non-overloaded state, further modifying the one or more throttle parameters, wherein said further modifying causes the system to reduce throttling of the incoming service requests by an amount smaller than the amount by which it was increased.

6. The system of claim 5, wherein the one or more throttle parameters comprises a throttle multiplier on which the percentage of incoming service requests that are throttled is dependent.

7. The system of claim 6, wherein prior to said detecting, the throttle multiplier is initialized to a value indicating that all incoming service requests should be serviced and no incoming service requests should be throttled.

8. The system of claim 5, wherein increasing throttling comprises increasing the percentage of incoming service requests that are throttled rather than serviced, and wherein the percentage of incoming service requests that are throttled rather than serviced is dependent on the modified values of the one or more throttle parameters.

9. The system of claim 5, wherein said modifying comprises modifying a throttle parameter value two or more times until throttling is increased by an amount large enough to return the system to a non-overloaded state.

10. The system of claim 5, wherein when executed by the one or more processors, the program instructions further cause the one or more processors to perform:
  subsequent to reducing throttling, determining whether the computer system is still in a non-overloaded state; and
  in response to determining that the computer system is still in a non-overloaded state, adjusting the throttle parameter, wherein said adjusting causes the system to further reduce throttling of the incoming service requests.

11. The system of claim 5, wherein said further modifying is performed when the system has been in a non-overloaded state for a pre-determined time period following the return of the system to a non-overloaded state.

12. The system of claim 5, wherein the percentage of incoming service requests that are throttled is dependent on a request priority rank associated with each of the incoming service requests.

13. The system of claim 5, wherein when executed by the one or more processors, the program instructions further cause the one or more processors to perform: determining whether the system is in an overloaded state at pre-determined time intervals.

14. The system of claim 5, wherein when executed by the one or more processors, the program instructions further cause the one or more processors to perform:
  determining that the system has returned to an overloaded state subsequent to reducing throttling; and
  in response to determining that the system has returned to an overloaded state, repeating said modifying.

15. The system of claim 5, wherein the system is considered to be in an overloaded state when client-specified quality of service expectations are not met for a pre-determined percentage of recently serviced requests.

16. A method, comprising:
performing, by a computer system that provides services to clients:
  receiving a plurality of requests for service;
  detecting that the computer system is in an overloaded state, wherein said detecting comprises determining that the computer system is in an overloaded state with respect to incoming service requests;
  in response to said detecting, increasing the value of a throttle multiplier, wherein said increasing causes the computer system to throttle a portion of incoming service requests subsequent to said increasing, and wherein the portion of incoming service requests that is throttled is dependent on the value of the throttle multiplier;
  determining whether the computer system is in an overloaded state following said increasing; and
  modifying the value of the throttle multiplier, wherein said modifying is dependent on said determining whether the computer system is still in an overloaded state.

17. The method of claim 16, further comprising, prior to said receiving, initializing the value of the throttle multiplier to a value that indicates that all incoming service requests should be serviced and no incoming service requests should be throttled.

18. The method of claim 16, wherein in response to determining that the computer system is still in an overloaded state, said modifying comprises further increasing the throttle multiplier value.

19. The method of claim 16, wherein in response to determining that the computer system is no longer in an overloaded state, said modifying comprises reducing the throttle multiplier value by an amount less than the amount by which it was increased.

20. The method of claim 19, wherein said reducing is performed after the computer system has been in a non-overloaded state for a pre-determined time period following the return of the computer system to a non-overloaded state.

21. The method of claim 16, wherein the portion of incoming service requests that is throttled is further dependent on a request priority rank associated with each of the incoming service requests.

22. The method of claim 16, wherein said determining whether the computer system is in an overloaded state is performed two or more times at pre-determined time intervals.

23. The method of claim 16, wherein the computer system is considered to be in an overloaded state when client-specified quality of service expectations are not met for a pre-determined percentage of recently serviced requests.

24. A non-transitory, computer-readable storage medium storing program instructions that when executed on one or more computers cause the one or more computers to perform:

initializing the value of a throttle multiplier in a computer system that provides services to clients to a value that indicates that all incoming service requests should be serviced and no incoming service requests should be throttled;

receiving a plurality of incoming service requests;

detecting that the computer system is in an overloaded state with respect to the incoming service requests;

in response to said detecting, increasing the value of the throttle multiplier by an amount that is large enough to cause the computer system to aggressively throttle incoming service requests;

determining that the computer system has returned to a non-overloaded state; and in response to determining that the computer system has returned to a non-overloaded state, reducing the throttle multiplier value by an amount smaller than the amount by which it was increased.

25. The storage medium of claim 24, wherein aggressively throttling incoming service requests comprises determining the portion of incoming service requests that should be throttled dependent on the increased throttle multiplier value.

26. The storage medium of claim 24, wherein said increasing comprises incrementing the throttle multiplier value two or more times until it reaches a value large enough to cause the computer system to return to a non-overloaded state.

27. The storage medium of claim 24, wherein when executed on the one or more computers, the program instructions further cause the one or more computers to perform:

subsequent to reducing throttling, determining whether the computer system is still in a non-overloaded state; and in response to determining that the computer system is still in a non-overloaded state, further reducing the throttle multiplier value.

28. The storage medium of claim 24, wherein said reducing is performed when the computer system has been in a non-overloaded state for a pre-determined time period following the return of the computer system to a non-overloaded state.

29. The storage medium of claim 24, wherein aggressively throttling incoming service requests comprises determining the portion of incoming service requests that should be throttled dependent on a request priority rank associated with each of the incoming service requests.

30. The storage medium of claim 24, wherein the computer system is considered to be in an overloaded state when client-specified quality of service expectations are not met for a pre-determined percentage of recently serviced requests.

* * * * *